(12) United States Patent
Kobayashi et al.

(10) Patent No.: US 11,821,810 B2
(45) Date of Patent: Nov. 21, 2023

(54) ROLLING MACHINE ELEMENT FATIGUE DIAGNOSIS METHOD AND ROLLING MACHINE ELEMENT FATIGUE DIAGNOSIS SYSTEM

(71) Applicant: NSK LTD., Tokyo (JP)

(72) Inventors: Daisuke Kobayashi, Kanagawa (JP); Koichiro Ono, Kanagawa (JP)

(73) Assignee: NSK LTD., Tokyo (JP)

( * ) Notice: Subject to any disclaimer, the term of this patent is extended or adjusted under 35 U.S.C. 154(b) by 35 days.

(21) Appl. No.: 17/596,712

(22) PCT Filed: Feb. 5, 2020

(86) PCT No.: PCT/JP2020/004419
§ 371 (c)(1),
(2) Date: Dec. 16, 2021

(87) PCT Pub. No.: WO2020/255476
PCT Pub. Date: Dec. 24, 2020

(65) Prior Publication Data
US 2022/0316984 A1    Oct. 6, 2022

(30) Foreign Application Priority Data

Jun. 17, 2019 (JP) ................................ 2019-111728

(51) Int. Cl.
*G01M 13/04* (2019.01)
(52) U.S. Cl.
CPC .................................. *G01M 13/04* (2013.01)
(58) Field of Classification Search
CPC ....... G01M 13/04; G01N 27/83; G01N 27/72; G01N 27/82; G01N 27/87
See application file for complete search history.

(56) References Cited

U.S. PATENT DOCUMENTS

2003/0070492 A1    4/2003  Buttle et al.
2011/0040495 A1*   2/2011  El-Refaie .............. G01M 13/04
                                                            702/182
2021/0270357 A1*   9/2021  Glenske .............. F16H 25/2204

FOREIGN PATENT DOCUMENTS

JP    63-034423 A      2/1988
JP    2008-032672 A    2/2008
JP    2008-032677 A    2/2008
JP    2009-041993 A    2/2009
JP    2009-198251 A    9/2009
(Continued)

OTHER PUBLICATIONS

Noritasu Oguma, "Prediction of Residual Fatigue Life if Bearings Part 1: Application of X-ray Diffraction Method", KOYO Engineering Journal, 2002, No. 161, 6pages.
(Continued)

*Primary Examiner* — Manuel L Barbee
(74) *Attorney, Agent, or Firm* — Sughrue Mion, PLLC

(57) ABSTRACT

A magnetic sensor arranged close to a component of a rolling machine element measures magnetic flux density in the axial direction and/or radial direction of the component, then the amount of change in magnetic flux density is calculated based on a reference magnetic flux density corresponding to the magnetic flux density before the start of use of the component, and the progression of fatigue of the rolling machine element is determined from the amount of change.

6 Claims, 14 Drawing Sheets

(56) References Cited

FOREIGN PATENT DOCUMENTS

| JP | 2012-042338 | A |   | 3/2012  |
|----|-------------|---|---|---------|
| JP | 2013-076617 | A |   | 4/2013  |
| JP | 2013-160561 | A |   | 8/2013  |
| JP | 2014-055941 | A |   | 3/2014  |
| JP | 2014055941  | A | * | 3/2014  |
| JP | 2014-219329 | A |   | 11/2014 |
| JP | 2018-194433 | A |   | 12/2018 |
| JP | 2018194433  | A | * | 12/2018 |
| JP | 2019-184540 | A |   | 10/2019 |
| JP | 2020-024172 | A |   | 2/2020  |

OTHER PUBLICATIONS

Japanese Office Action Notice of Reasons for Refusal for JP 2021-527344 dated Oct. 12, 2021.
International Search Report for PCT/JP2020/004419 dated May 12, 2020 [PCT/ISA/210].

* cited by examiner

ROLLING MACHINE ELEMENT FATIGUE DIAGNOSIS METHOD AND ROLLING MACHINE ELEMENT FATIGUE DIAGNOSIS SYSTEM

CROSS REFERENCE TO RELATED APPLICATIONS

This application is a National Stage of International Application No. PCT/JP2020/004419 filed Feb. 5, 2020, claiming priority based on Japanese Patent Application No. 2019-111728 filed Jun. 17, 2019.

TECHNICAL FIELD

The present invention relates to a fatigue diagnosis method and fatigue diagnosis system for a rolling machine element such as a rolling bearing, linear motion device or the like, and more specifically, relates to a fatigue diagnosis method and fatigue diagnosis system for diagnosing a state of a raceway surface made of a magnetic material of rolling machine elements such as rolling bearings having raceway surfaces for rolling bodies, including ball bearings such as deep groove ball bearings, roller bearings such as cylindrical roller bearings, conical roller bearings, spherical (self-aligning) roller bearings, and the like, or linear motion devices or the like provided with components having raceway surfaces for rolling bodies, without having to disassemble the rolling machine element.

BACKGROUND ART

Rolling bearings such as ball bearings, roller bearings and the like, and linear motion devices are incorporated in rotation support portions of various mechanical devices. For example, a rolling bearing includes an outer ring and an inner ring, which is a pair of raceway rings that are arranged coaxially with each other, and a plurality of rolling bodies. The outer ring has an outer-ring raceway around the inner-circumferential surface thereof, and the inner ring has an inner-ring raceway around the outer-circumferential surface thereof. A plurality of rolling bodies is arranged between the outer-ring raceway and the inner-ring raceway so as to be able to freely roll. For example, the rolling bearing rotatably supports a rotating shaft inside a housing with the outer ring internally fitted inside the housing and the inner ring externally fitted around the rotating shaft.

During operation of the rolling bearing, the rolling bodies repeatedly pass over the raceway surfaces of the outer-ring raceway and the inner-ring raceway, and thus in the load area of the load, the raceway surfaces made of a magnetic material such as steel or the like repeatedly receive loading from the rolling bodies. Therefore, as time passes, rolling fatigue progresses underneath the surface of the raceway surface due to the occurrence of change in the material structure (metal structure), residual stress, hardness, and the like. As this kind of rolling fatigue progresses, cracking may occur underneath the surface of the raceway surface, which may lead to peeling. When peeling occurs, not only does noise and vibration that occurs during operation of the rolling bearing become large, but there is also a possibility that in the end cracking or breakage will occur in a raceway ring. Such circumstances are the same whether in a rolling bearing that is used in a form of usage in which loading is applied to the entire circumference of the raceway rings, or in a linear motion device that includes components having raceway surfaces for rolling bodies.

In view of these circumstances, JP 2012-42338A (Patent Literature 1) describes a technique of detecting abnormality in a rolling bearing by monitoring vibration that occurs due to damage such as peeling and the like. According to this kind of conventional technique, it is possible to take measures such as prompting replacement or the like before it becomes impossible to use the rolling bearing due to cracking or breakage of the raceway rings. However, since abnormality is detected after the occurrence of damage, for example, in a case in which abnormality is detected during operation of equipment in which a rolling bearing is assembled, there is a possibility that the equipment will have to be stopped in order to perform work to replace the rolling bearing. On the other hand, in a case where the state of progression of fatigue is known before damage occurs, it becomes possible to perform replacement work while the equipment is not in operation. In view of such circumstances, it is desirable that the state of progression of fatigue be known before damage occurs.

JP S63-34423B2 (Patent Literature 2), JP 2009-041993A (Patent Literature 3), and the like describe techniques of diagnosing the progression of fatigue of a rolling bearing by using X-rays to measure the half width of martensite and the amount of retained austenite contained in the material structure of the bearing parts of the rolling bearing. With a diagnosis method that uses X-rays in this way, it becomes possible to know the state of progression of fatigue before damage to the bearing parts occurs.

However, in a diagnosis method that uses X-rays, taking into consideration the effects of X-rays on the human body, it is necessary to perform X-rays in a space shielded from the outside. An X-ray diffraction device used for diagnosis is large in size and is generally placed on the floor. Therefore, it is difficult to perform a diagnosis method that uses X-rays in a location such as a factory where equipment is provided in which a rolling bearing to be diagnosed is assembled. Moreover, in order to irradiate X-rays on a surface of a bearing component, it is necessary to disassemble the rolling bearing, and thus the amount of work required for diagnosis increases. Furthermore, changes in the metal structure or the like proceed underneath the surfaces of the bearing components, and thus in many cases it becomes necessary to cut the bearing part. Therefore, there is an inconvenience in that the rolling bearing cannot be used after diagnosis.

CITATION LIST

Patent Literature

[Patent Literature 1] JP 2012-42338A
[Patent Literature 2] JP S63-34423B2
[Patent Literature 3] JP 2009-041993A

SUMMARY OF INVENTION

Technical Problem

The present invention has been made to solve the above problems, and an object of the invention is to provide a rolling machine element fatigue diagnosis method and fatigue diagnosis system that is capable of detecting a state of progression of component fatigue without having to disassemble the rolling machine element, and before damage to the components of the rolling machine element occurs.

Solution to Problem

The inventors of the present invention noticed that as rolling bodies of a rolling machine element such as a rolling bearing, linear motion device, or the like repeatedly pass over a raceway surface made of a magnetic material such as steel or the like, the material structure (metal structure) underneath the raceway surface changes over time (hereinafter, in this specification, this change in structure will be referred to as "fatigue"). The change in the material structure that occurs underneath the raceway surface of the rolling machine element simultaneously occurs with a change in the magnetic property, and it was found that different magnetic fields are generated before and after use of the rolling machine element (before and after fatigue), and that the magnetic flux density changes. It was found that the change in the magnetic flux density (magnetic field) is correlated with the progression of fatigue of the rolling machine element. Furthermore, it was found that, of the change in magnetic flux density, the amount of change in magnetic flux density in the axial direction and radial direction of the rolling machine element is correlated with the state of progression of fatigue (the sate of change in material structure). The present invention is the result of diligent studies based on such findings.

The fatigue diagnosis method for a rolling machine element according to one aspect of the present invention is a method for diagnosing a state of progression of fatigue of the rolling machine element, and includes a diagnosis step of diagnosing the fatigue state of the rolling machine element based on change in magnetic field information of the rolling machine element.

Examples of the rolling machine element include rolling bearings such as ball bearings, roller bearings and the like that have a raceway ring as a component made of a magnetic material such as steel or the like and having a raceway surface that receives a load from rolling bodies, or linear motion devices such as linear guides, ball screws or the like that include a component made of a magnetic material and having a raceway surface that receives a load from rolling bodies.

As magnetic field information, it is possible to use magnetic field information of a component having the raceway surface. In this case, the diagnosis step may include a measurement step in which a magnetic sensor (magnetic field measuring device) is arranged near the component and measures the magnetic field information of the component. Near the component, in a case where the component is a raceway ring, may mean on a side in the axial direction or on a side in the radial direction of the raceway ring. Moreover, in a case where the component is a component of a linear motion device, near the component may mean on a side in the radial direction of the component.

It is possible to diagnose the fatigue state of the rolling bearing by comparing a value of magnetic flux density corresponding to the magnetic field information measured in the measurement step with a threshold value set for the value of the magnetic flux density.

As the magnetic field information, it is possible to use magnetic flux density in the axial direction and/or radial direction of the component.

The diagnosis step may include a change amount calculation step that, based on a reference magnetic flux density corresponding to magnetic flux density before the start of use of the component, calculates an amount of change in the magnetic flux density measured in the measurement step.

As the magnetic flux density, it is possible to use the magnetic flux density in a portion in the circumferential direction of the component corresponding to a no-load area, or it is possible to use the magnetic flux density before the start of use of a portion in the circumferential direction of the component corresponding to a load area. As the magnetic flux density that is measured in the measurement step, it is possible to use the magnetic flux density in a portion in the circumferential direction of the component corresponding to the load area.

The diagnosis step may include a determination step that, using determination data that indicates a correlation between progression of fatigue of a test rolling machine element of the same kind as the rolling machine element that is found in advance by X-ray measurement using the test rolling machine element, and an amount of change in magnetic flux density in an axial direction and/or radial direction of a component of the test rolling machine element of the same kind as the rolling machine element found in advance using the test rolling machine element, determines progression of fatigue of the rolling machine element based on the amount of change in the magnetic flux density calculated in the change amount calculation step.

The fatigue diagnosis method for a rolling machine element according to one aspect of the present invention may further include a preparation step for finding the determination data. The preparation step is a step of performing a test on the test rolling machine element, and may include first to third preparation steps.

The first preparation step is a step of finding an amount of change in magnetic flux density in the axial direction and/or radial direction of the component of the test rolling machine element before and after testing. The second preparation step is a step of finding progression of fatigue of the test rolling machine element after testing. The third preparation step is a step of creating determination data indicating correlation between the progression of fatigue found in the second preparation step and the amount of change in the magnetic flux density found in the first preparation step.

In the second preparation step it is possible to find the progression of fatigue by using the amount of decrease in the martensite half width of the component of the test rolling machine element before and after the testing.

In the first preparation step, it is possible to find the amount of change in the magnetic flux density in both the axial direction and the radial direction and to create the determination data with data indicating correlation between the progression of fatigue, the amount of change in magnetic flux density in the axial direction, and the amount of change in magnetic flux density in the radial direction. In this case, the determination data may be a determination map in which the progression of fatigue is mapped on a coordinate system where two axes are taken to be the amount of change in magnetic flux density in the axial direction and the amount of change in magnetic flux density in the radial direction, or a determination map that is divided according to the progression of fatigue.

In the fatigue diagnosis method for a rolling machine element according to one aspect of the present invention, the determination data may be data indicating correlation between the progression of fatigue and an amount of change in the magnetic flux density in either one of the axial direction or the radial direction.

The fatigue diagnosis method for a rolling machine element according to one aspect of the present invention may perform diagnosis without having to disassemble the rolling machine element.

A fatigue diagnosis system for a rolling machine element according to one aspect of the present invention includes a magnetic sensor, a calculating unit, a storage unit, and a determining unit.

The magnetic sensor is capable of measuring magnetic flux density in an axial direction and/or radial direction of a component of a rolling machine element as a diagnosis target.

The calculating unit is capable of calculating an amount of change in the magnetic flux density measured by the magnetic sensor based on a reference magnetic flux density corresponding to the magnetic flux density before starting use of the component.

The storage unit stores determination data that indicates correlation between progression of fatigue of a component of a test rolling machine element of the same kind as the rolling machine element found in advance by X-ray measurement using the test rolling machine element and an amount of change in magnetic flux density in an axial direction and/or radial direction of the component of the test rolling machine element.

The determining unit determines progression of fatigue of the rolling machine element from the amount of change in magnetic flux density calculated by the calculating unit based on the determination data stored in the storage unit.

Advantageous Effects of Invention

The fatigue diagnosis method and fatigue diagnosis system for a rolling machine element according to the present invention focus on the fact that a change in structure due to fatigue of a rolling machine element is accompanied by a change in magnetic flux density (magnetic field). Magnetic field lines are generated around a site where change in the magnetic field appears. Therefore, with the fatigue diagnosis method and fatigue diagnosis system for a rolling machine element according to the present invention, it is possible to measure change in magnetic flux density by using a magnetic sensor that is capable of detecting the magnetic field lines in the rolling machine element even in a non-disassembled state in which the rolling machine element is not disassembled. As a result, it is possible to diagnose the fatigue state of the rolling machine element without disassembling the rolling machine element.

With the fatigue diagnosis method and fatigue diagnosis system for a rolling machine element according to the present invention, it is possible to know the fatigue state of the rolling machine element without having to disassemble the rolling machine element, and thus it is possible to periodically replace the rolling machine element and the like and to operate the rolling machine element and the device that is provided with the rolling machine element efficiently and safely. Moreover, with the fatigue diagnosis method and fatigue diagnosis system for a rolling machine element according to the present invention, it is possible to measure the change in magnetic flux density by simply bringing a magnetic sensor in contact with or close to a measurement surface, which is effective in greatly reducing maintenance time.

DESCRIPTION OF EMBODIMENTS

An embodiment of a fatigue diagnosis method for a rolling machine element and a fatigue diagnosis system used in this fatigue diagnosis method according to the present invention is described while appropriately referencing the drawings. Note that the drawings are schematic drawings. Therefore, it should be noted that the relationships and ratios between the thickness and the plane dimensions are different from an actual case, and the drawings include parts having different dimensional relationships and ratios among them. Moreover, the embodiments described below exemplify devices and methods for embodying the technical idea of the present invention, and the present invention is not limited by the material, shape, structure, arrangement, and the like of the component parts in the embodiments described below.

First Example

Figure 1A:
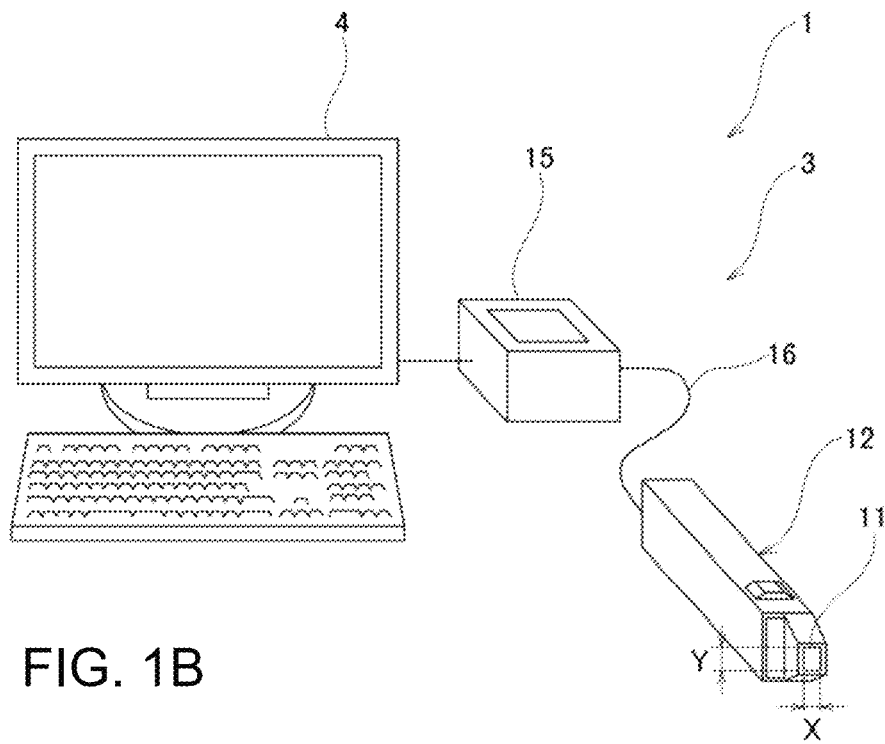
FIG. 1A is a schematic perspective view of a fatigue diagnosis system of a first example of an embodiment of the present invention.
Figure 1B:
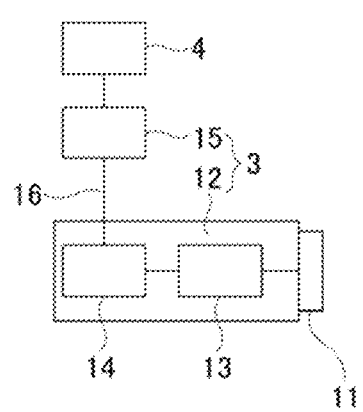
FIG. 1B is a block diagram of the fatigue diagnosis system of the first example.

A first example of an embodiment of the present invention will be described using FIG. 1A to FIG. 7.
[Overall Configuration of Fatigue Diagnosis System]
FIG. 1A and FIG. 1B illustrate a first example of a fatigue diagnosis system. The fatigue diagnosis system 1 includes a magnetic sensor (magnetic field measuring device) 3 and a diagnostic device 4 composed of an information processing device. In this example, as a rolling machine element, a rolling bearing is taken to be the diagnosis target. In the following, a rolling bearing 2 as the diagnosis target will be described, after which the fatigue diagnosis system 1 of this example will be described.
<Rolling Machine Element (Rolling Bearing)>

Examples of the rolling bearing 2 may include rolling bearings such as ball bearings that are deep-groove type, angular type or the like, conical roller bearings, cylindrical roller bearings, needle bearings, self-aligning bearings and the like, where the type (bearing type) and size of the rolling bearing does not matter. The fatigue diagnosis system 1 of this example performs diagnosis by measuring magnetic field information of a rolling machine element that changes according to the progression of fatigue, and more specifically, performs diagnosis by measuring magnetic flux density (magnetic field) of a component of the rolling machine element having a raceway surface, and thus at least, the component of the rolling bearing 2, or in other words, in this example, the outer ring 5, which is a raceway ring and whose magnetic flux density will be measured, is required to be made of a magnetic material. Examples of the magnetic material include a ferromagnetic material such as a steel including bearing steel, an alloy including at least one of iron, cobalt, and nickel; however, the present invention can be widely applied to rolling machine elements including components using normal magnetic material or anti-magnetic material as the magnetic material.

Figure 2:
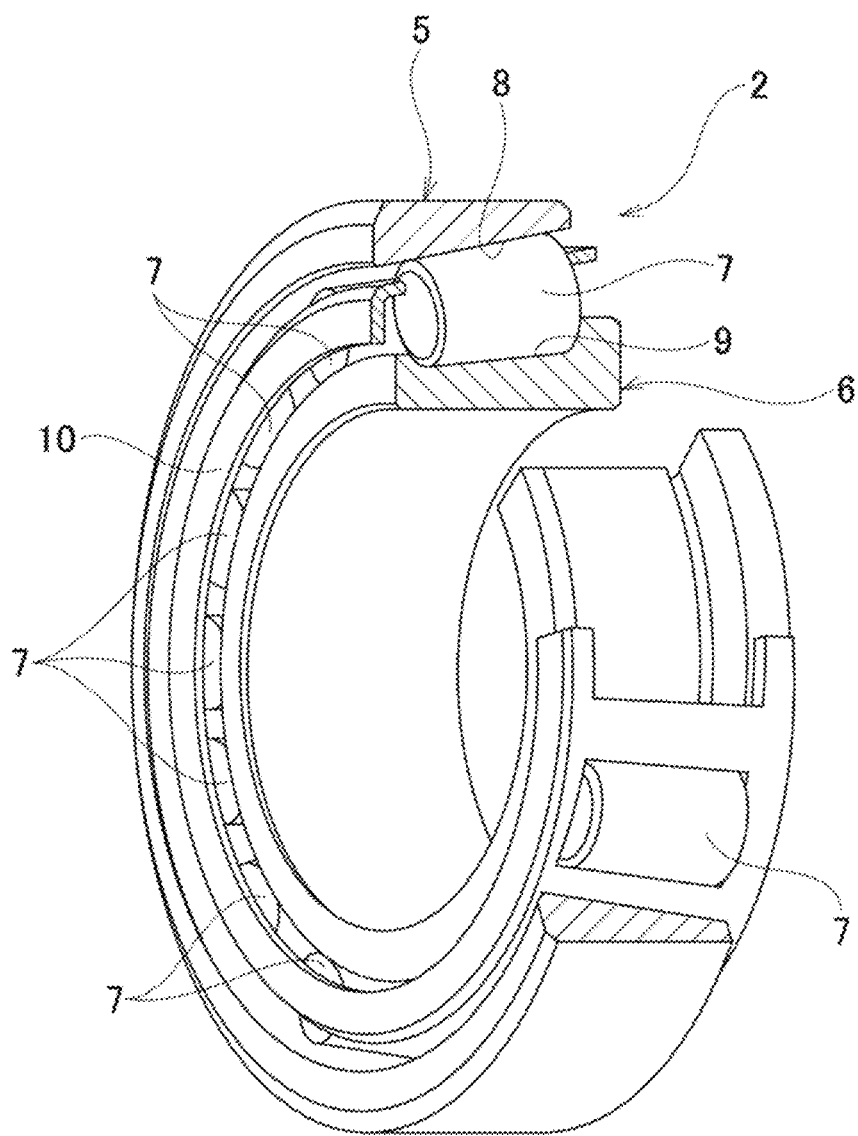
FIG. 2 is a partial cut perspective view of an example of a roller bearing as a rolling machine element to be diagnosed using a fatigue diagnosis method of the first example.

The rolling bearing 2, as illustrated in FIG. 2, includes an outer ring 5 and an inner ring 6 as a pair of raceway rings, each of which is ring shaped, and a plurality of rolling bodies 7. The outer ring 5 has an outer-ring raceway 8 around the inner-circumferential surface thereof, and the inner ring 6 has an inner-ring raceway 9 around the outer-circumferential surface thereof. A plurality of rolling bodies 7 is arranged between the outer-ring raceway 8 and the inner-ring raceway 9 so as to be able to freely roll. The rolling bodies 7 are held by a retainer 10 so as to be able to freely roll, and are arranged at uniform intervals in the circumferential direction. In the illustrated example, conical rollers are used as the rolling bodies 7. The rolling bearing 2 may also further include as necessary a seal member.

The outer ring 5, the inner ring 6 and the rolling bodies 7, which are bearing parts, are made of an iron-based alloy (steel) such as bearing steel typified by high carbon chrome bearing steel (SUJ2), medium carbon steel, carburized steel or the like, and have been subjected to heat treatment such as sub-quenching, carburizing, nitriding quenching, or the like, and are magnetic.

The rolling bearing 2 can be used, for example, in inner-ring rotation type usage forms in which, by internally fitting the outer ring 5 in a housing and externally fitting the inner ring 6 onto a rotating shaft, the rolling bearing 2 rotatably supports the rotating shaft inside the housing. Alternatively, the rolling bearing 2 can be used in outer-ring rotation type usage forms in which, by internally fitting the outer ring 5 in a rotating body and externally fitting the inner ring 6 to a fixed shaft, the rolling bearing 2 rotatably supports the rotating body around the fixed shaft.

Figure 3:
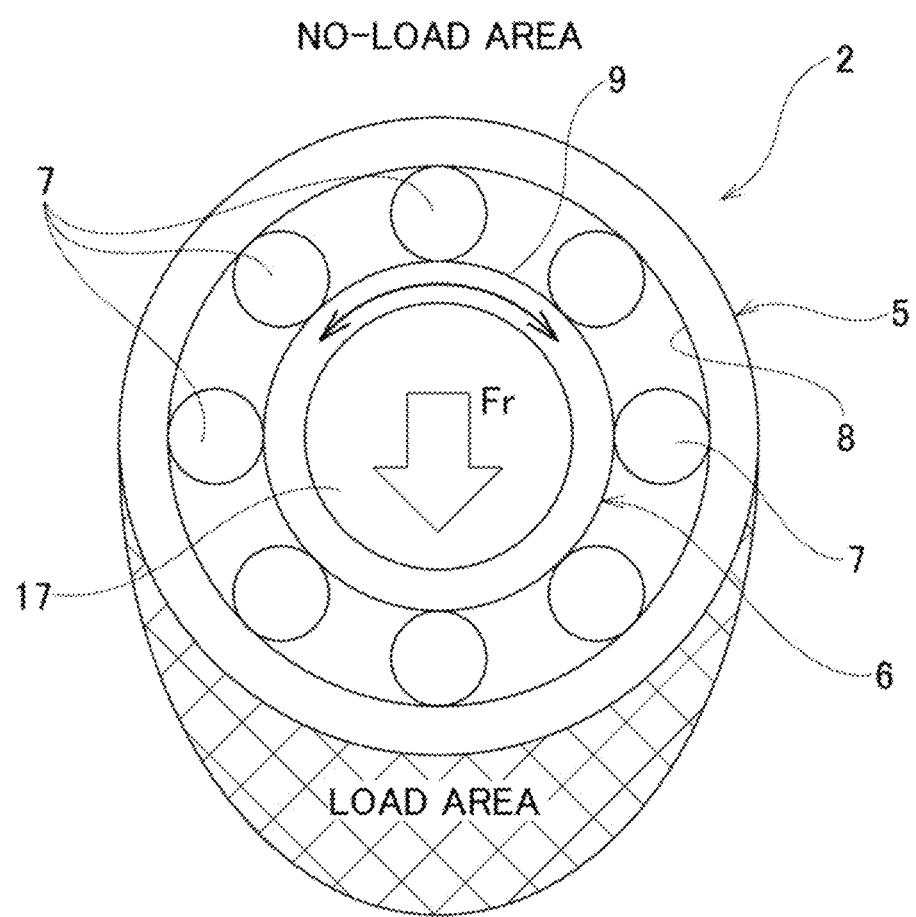
FIG. 3 is a schematic side view for describing an example of a form of usage of the roller bearing illustrated in FIG. 2.

In this example, the fatigue state of the rolling bearing 2 is diagnosed based on the following principles. As illustrated in FIG. 3, when the rolling bearing 2 is used in an inner-ring type usage form, and a radial load Fr is applied in a downward direction to a rotating shaft 17 onto which the inner ring 6 is externally fitted, the load distribution of the rolling bodies 7 is as illustrated by the diagonal grid pattern, and of the outer ring 5 of the rolling bearing 2, the lower side portion (area indicated by the diagonal grid pattern) becomes the load area, and the other portion becomes the no-load area. Therefore, of the raceway surface of the outer-ring raceway 8, underneath the surface of the portion existing in the load area, the magnetism changes as the metal structure changes due fatigue. More specifically, decomposition of retained austenite, which is a non-magnetic layer, and relaxation of strain in the martensite structure occur (becomes easy for the domain wall to move). Therefore, before and after using the rolling bearing 2 (before and after fatigue), the magnetic flux density (magnetic field) of the outer ring 5 changes according to a change in magnetism of the outer ring 5. Moreover, the amount of change in the magnetic flux density correlates with the progression of fatigue, and thus it becomes possible to diagnose the state of fatigue of the rolling bearing 2 by using the amount of change in the magnetic flux density.

Figure 4A:
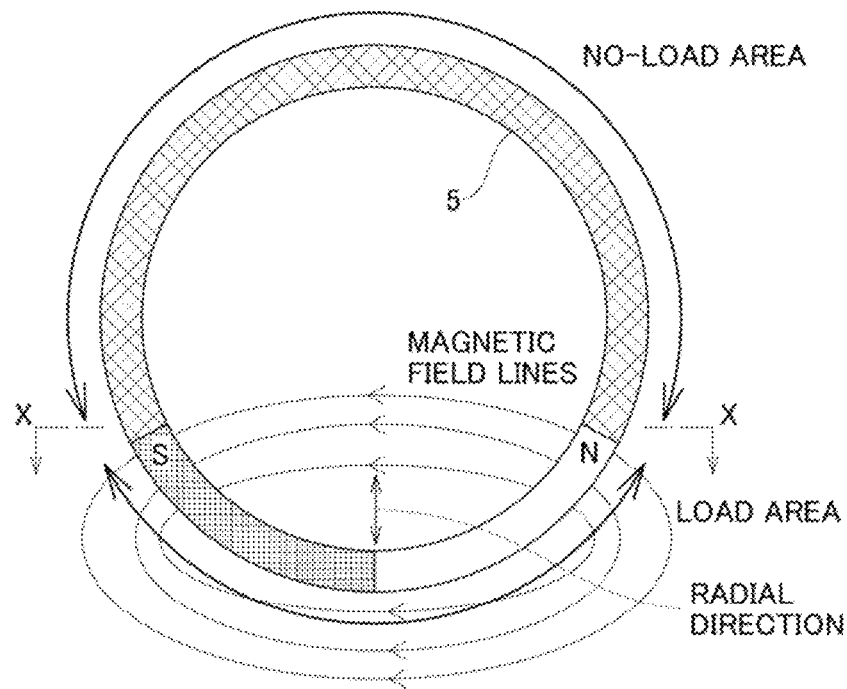
FIG. 4A is a schematic side view for explaining the magnetic field lines generated from the outer ring of the roller bearing illustrated in FIG. 2.
Figure 4B:
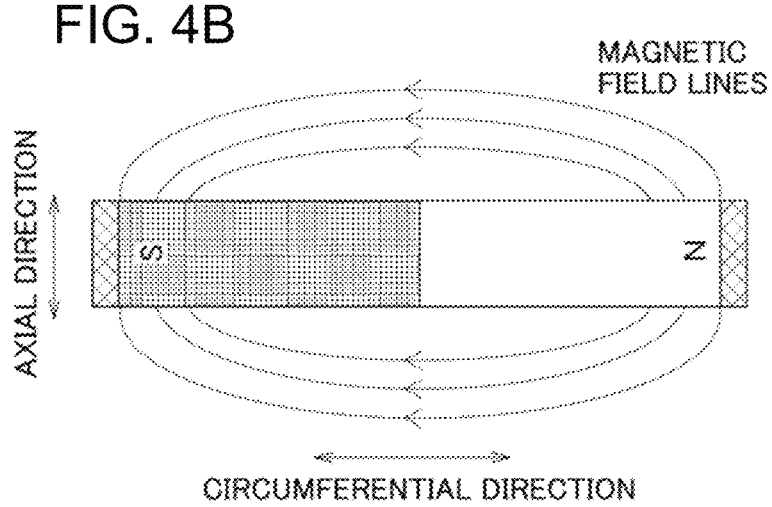
FIG. 4B is a cross-sectional view of section line X-X in FIG. 4A.

Magnetic force occurring in the outer-ring raceway 8 becomes high in the load area compared with the no-load area, and as indicated by the arrows in FIG. 4A and FIG. 4B, magnetic field lines occur around the outer ring 5 according to the magnetic flux density. Therefore, by arranging the magnetic sensor 3 near the outer ring 5 (on the side in the axial direction, or on the outer side in the radial direction), it becomes possible to measure the magnetic flux density of the outer ring 5 even without disassembling the rolling bearing 2. More specifically, as illustrated in FIG. 4A, magnetic field lines appear not only on the inner-circumferential surface side where the outer-ring raceway 8 is provided, but also appear on the outer-circumferential surface side of the outer ring 5. Therefore, it is possible to measure a change in the magnetic flux density (change in the magnetic field) from the outer side in the radial direction (outer-circumferential surface side) of the outer ring 5. Furthermore, as illustrated in FIG. 4B, magnetic field lines also occur from the side surfaces in the axial direction (end surfaces) of the outer ring 5, and thus it is also possible to measure a change in the magnetic flux density of the outer ring 5 from the sides in the axial direction of the outer ring 5. As a result, it becomes possible to diagnose the state of fatigue of the rolling bearing 2 without having to disassemble the rolling bearing 2.
<Magnetic Sensor>

The magnetic sensor 3 is a measuring device for measuring magnetic flux density (magnetic field), and as illustrated in FIG. 1A and FIG. 1B, has a main unit 15 and a probe 12. The main unit 15 is formed into a box-like shape, can be carried by hand, and is able to display measurement values. The probe 12 is connected to the main unit 15 via a signal cable 16. There is a magnetic-sensing portion 11 on the end portion of the probe 12. A Hall element is provided inside the magnetic-sensing portion 11 for outputting a voltage that is proportional to the magnetic flux density. A processing unit 13 for measuring the magnetic flux density based on the voltage outputted from the Hall element is packaged inside the probe 12.

The probe 12 is able to measure magnetic flux density based on the voltage outputted from the Hall element, which outputs a voltage that is proportional to the magnetic flux density. An external-output unit 14 is provided inside the probe 12. The external-output unit 14 is able to output measurement results of the magnetic flux density by the processing unit 13 to the main unit 15 via the signal cable 16. The main unit 15 is able to output measurement results of the magnetic flux density by the processing unit 13 via the external diagnostic device 4. The fatigue diagnosis system 1 of this example does not require a magnetic field generating means such as a permanent magnet or the like as a reference, and thus such a magnetic field generating means is not provided. Note that by using a 3-axis magnetic sensor that is capable of measuring magnetic field information in 3-axis directions as the magnetic sensor 3, it is possible to acquire magnetic field information that combines the results in 3-axis directions.

[Fatigue Diagnosis Method]

Figure 5:
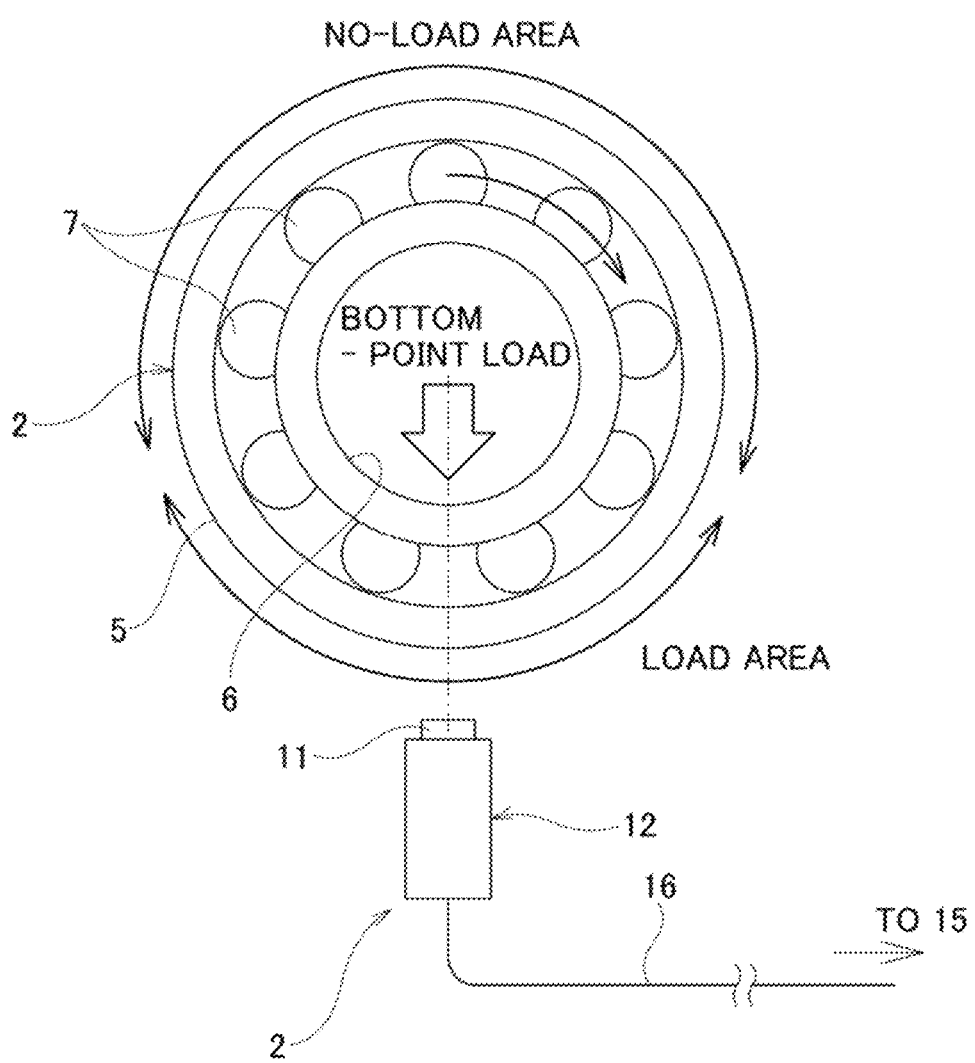
FIG. 5 is a schematic view illustrating an example of the implementation status (measurement step) of the fatigue diagnosis method of the first example.

In the fatigue diagnosis method of this example, as illustrated in FIG. 5, the magnetic-sensing portion 11 of the magnetic sensor 3 is arranged on the load-area side of the rolling bearing 2. The reason that the magnetic-sensing portion 11 is arranged in such a position is based on knowledge that on the load-area side of the rolling bearing 2, a magnetic field occurs due to fatigue that occurs underneath the surface (portion including the surface and the internal portion) of the raceway surface of the outer-ring raceway 8, which causes fluctuation in the magnetic field distribution. Moreover, in this way, the intensity of the magnetic field (magnitude of the magnetic flux density) that occurs underneath the surface of the raceway surface of the outer-ring raceway 8 is sufficiently larger than the external magnetic field that occurs naturally.

The magnetic-sensing portion 11 is able to detect fatigue underneath the surface of the raceway surface of the outer-ring raceway 8 by detecting magnetic field fluctuation underneath the surface of the raceway surface of the outer-ring raceway 8. In order to diagnose a fatigued portion of the rolling bearing 2, it is necessary to set the state before use of the rolling bearing 2 that is the diagnosis target as a reference (standard).

The arrangement location of the magnetic-sensing portion 11 with respect to the measured part of the rolling bearing 2 can be adjusted according to the space around the rolling bearing 2. The magnetic-sensing portion 11 may be arranged so as just to come in contact with the measured surface of the rolling bearing 2, or may be separated from the outer ring 5 by just a distance such as not to be affected by the residual magnetic field of the rolling bearing 2. In this example, the opposing distance between the magnetic-sensing portion 11 and the outer ring 5 can be set, for example, to 2 mm.

Note that in a case of detecting cracking or the like that occurs in the steel material of the raceway ring instead of diagnosing fatigue, it is necessary to separately prepare a test body (rolling bearing) to serve as a reference in which cracking has not occurred, and determine whether or not cracking has occurred based on the measurement values of the reference test body.

On the other hand, in the fatigue diagnosis method of this example, a fatigued part of the rolling bearing 2 is diagnosed, and therefore, in a case where there is no change in quality during use of the rolling bearing 2 (no fatigue occurs), it is possible to set that position as a position indicating a reference (standard) corresponding to the state before use of the rolling bearing 2. For example, in the fatigue diagnosis method of this example, by comparing the measurement results of the magnetic field information of the load area of the outer-ring raceway where a load is applied from the rolling bodies and of the no-load area of the outer-ring raceway where no load is applied from the rolling bodies, it is possible to diagnose the fatigue state of the outer-ring raceway. More specifically, in a usage form in which the outer ring 5 of the rolling bearing 2 is fixed to the housing or the like, and a load in the radial direction is applied to the outer ring 5, the opposite side from the load area becomes the no-load area, and thus it is possible to set the position of the no-load area as the reference position.

Figure 6:
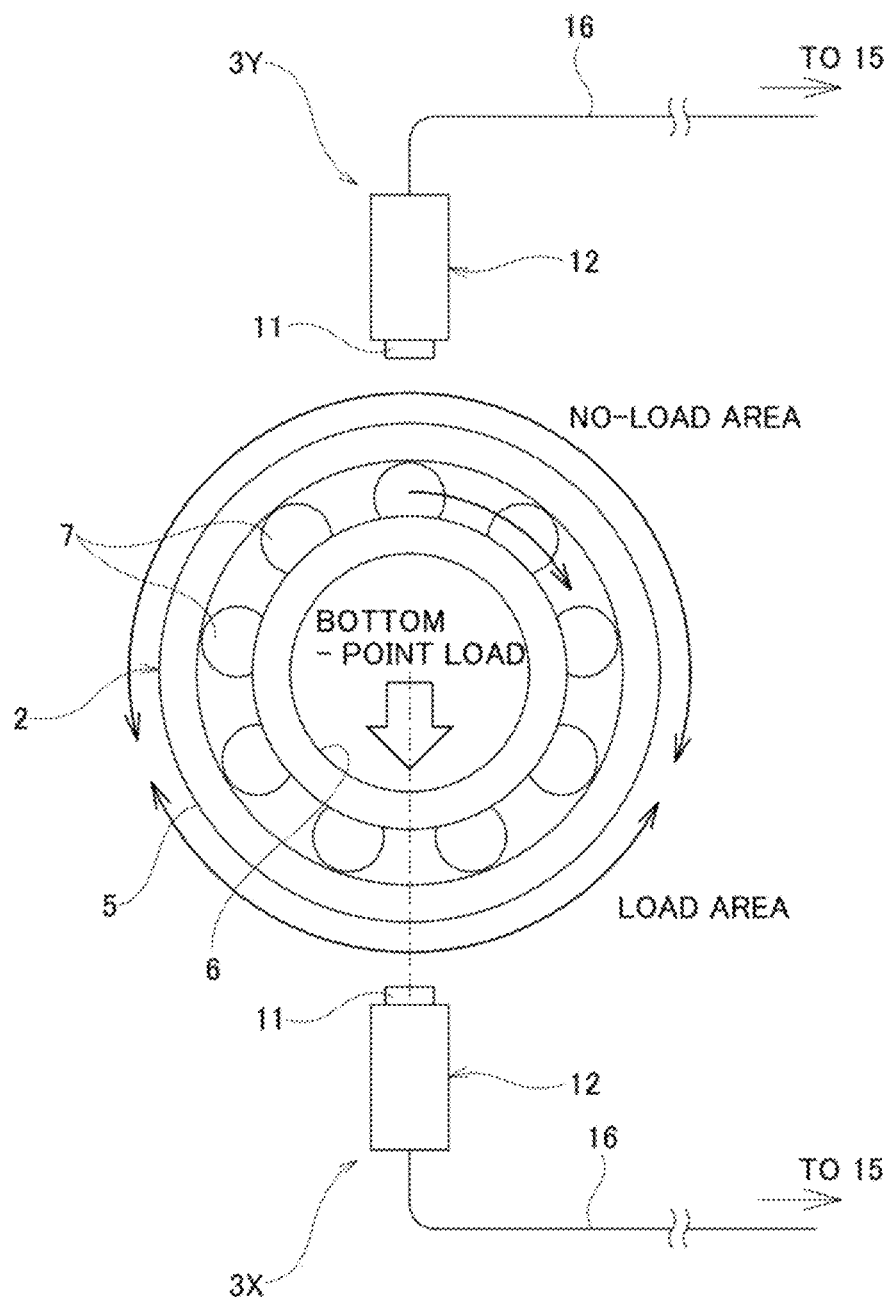
FIG. 6 is a schematic view illustrating another example of the implementation status (measurement step) of the fatigue diagnosis method of the first example.

In the fatigue diagnosis method of this example, when diagnosing a rolling machine element, it is possible to diagnose the fatigue state by comparing the magnetic flux density that is obtained from the magnetic field information acquired by the magnetic sensor with a threshold value that is set for the value of the magnetic flux density. More specifically, as illustrated in FIG. 6, two magnetic sensors 3X, 3Y having the same construction are prepared as the magnetic sensor 3. The magnetic-sensing portion 11 of each magnetic sensor 3X, 3Y is arranged so as to face the outer-circumferential surface or the inner-circumferential surface of the outer ring 5. The surface that is faced by the magnetic-sensing portion 11 of the magnetic sensor 3X is the same type of surface as the surface faced by the magnetic-sensing portion 11 of the magnetic sensor 3Y.

In the example in FIG. 6, the magnetic-sensing portion 11 of the first magnetic sensor 3X, in order to measure the magnetic flux density of the load area of the outer ring 5, is arranged facing a position corresponding to the load area in the circumferential direction of the outer-circumferential surface of the outer ring 5. On the other hand, the magnetic-sensing portion 11 of the second magnetic sensor 3Y, in order to measure the magnetic flux density of the no-load area, is arranged facing a position corresponding to the no-load area in the circumferential direction of the outer-circumferential surface of the outer ring 5. By arranging a magnetic-sensing portion 11 even on the no-load area side in this way, it is possible to set the no-load area side as a reference position. In other words, the magnetic field information from the magnetic sensor arranged in the no-load area can be used as the reference magnetic flux density (magnetic flux density corresponding to the state before use of the rolling bearing 2).

As a result, by comparing, for example, the difference between the magnetic flux density obtained from the magnetic field information acquired by the magnetic sensor 3X and the magnetic flux density obtained from the magnetic field information acquired by the magnetic sensor 3Y (reference value) with a threshold value that is related to value set in advance for that difference, it is possible to diagnose the fatigue state of the rolling bearing 2.

On the other hand, in a case of a usage form in which a load is applied around the entire circumference of the raceway ring of the rolling bearing 2 (for example, a case where the outer ring rotates), the entire circumference of the outer ring fatigues, and thus it is not possible to set a reference position for diagnosing the fatigue state of the rolling bearing as a diagnosis target. In a case of this kind of usage form, it is possible to set a location existing around the rolling bearing 2, where change in the magnetic field does not occur even when using the rolling bearing 2, as the reference position. Alternatively, in a case where a magnetic body in which change in the magnetic field may occur does not exist in the space (empty space) around the rolling bearing 2, the space can be set as a reference position. In other words, the value of the magnetic flux density obtained from magnetic field information measured by arranging the magnetic-sensing portion of the magnetic sensor to face the space can be set as a reference value. In this way, in a usage form in which the entire circumference of a raceway ring of a rolling bearing, or the entire circumference of a component of a linear motion device having a raceway surface that receives a load from rolling bodies is the load area, it is possible to set a location other than the rolling bearing or the component that does not receive a change in magnetic field as a reference. In this case, it is necessary to reset the state of the magnetic field before use of the rolling machine element to zero.

In the fatigue diagnosis method of a rolling machine element of this example, in order to suitably know the state of the magnetic field of the rolling machine element itself, such as a rolling bearing, linear motion device, or the like as a diagnosis target, preferably the rolling machine element is not demagnetized or magnetized before measurement (diagnosis) by the magnetic sensor. For example, the magnetic sensor measures the magnetic flux density of the raceway ring or a component itself that changes when the raceway ring or the component having a raceway surface receives a load, and thus when the magnetic field state changes due to being demagnetized or magnetized, it may not be possible to accurately perform diagnosis. Note that when performing fatigue diagnosis, it is not necessary to fix the magnetic sensor. A worker is able to hold the magnetic sensor by hand and measure around the entire circumference of the raceway ring of the rolling bearing or component of a linear motion device. However, in a case where high diagnosis precision is necessary, the magnetic sensor is preferably fixed to a specified location.

Example 1

An example of the fatigue diagnosis method for a rolling bearing 2 using a magnetic sensor 3 of a first example of an embodiment will be described.

In this example, as the rolling bearing 2, a deep-groove ball bearing for which a functional evaluation has been completed is taken to be the diagnosis target. The deep-groove ball bearing was used for diagnosis (measurement) as a whole deep-groove ball bearing without being disassembled into an inner ring, an outer ring, rolling bodies, and a retainer. When performing diagnosis, a test shaft (not illustrated) was inserted into the inner ring 6 of the rolling bearing 2 for which the functional evaluation has been completed. Moreover, the outer ring 5 of the rolling bearing 2 was fixed to a test housing (not illustrated), and a bearing support cover (not illustrated) was placed on the test housing from the side surface side in the axial direction of the rolling bearing 2.

The probe 12 of the magnetic sensor 3 was brought in contact with or close to the side surface in the axial direction of the outer ring 5 fixed to the test housing, and measured the magnetic flux density of the side surface in the axial direction of the outer ring 5. Note that the magnetic field property is measured after the test is completed, and thus the rolling bearing 2 is not demagnetized or magnetized before measurement.

The probe 12 of the magnetic sensor 3 is placed on the bearing support cover so that the magnetic-sensing portion 11 faces the side surface in the axial direction of the outer ring 5. In this state, the magnetic sensor 3 measured the magnetic flux density of the outer ring 5 in which there is a load area and a no-load area. In this example, the magnetic flux density (direction and intensity of the magnetic poles) was measured at four locations, each separated by 90 degrees in the circumferential direction of the bearing support cover (0 degrees, 90 degrees, 180 degrees and 270 degrees). More specifically, the central portion of the load area was taken to be the 180-degree position, and the opposing surface side positioned on the opposite side in the radial direction with respect to the central position of the load area was taken to be the reference 0-degree position. The position shifted 90 degrees to one side in the circumferential direction from the 0-degree position was taken to be the 90-degree position, and the position shifted 90 degrees to the other side in the circumferential direction from the 0-degree position was taken to be the 270-degree position.

Figure 7:
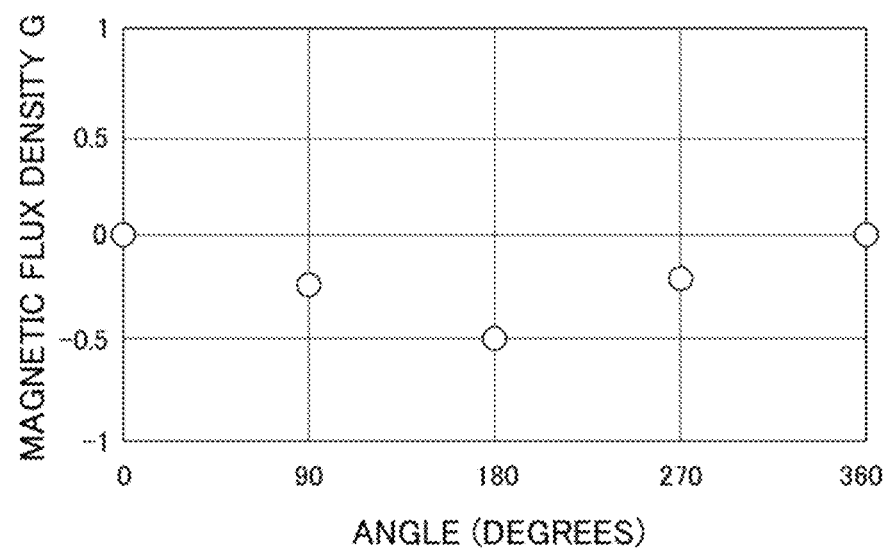
FIG. 7 is a graph of an example of test results in which a magnetic field is measured from the axial side surface of a raceway ring which is a component of the roller bearing illustrated in FIG. 2, of the first example.

FIG. 7 illustrates the measurement results of this example. More specifically, at each of four positions uniformly arranged at 0 degrees, 90 degrees, 180 degrees, and 270 degrees, the magnetic flux density of the outer ring 5 was measured in the depth direction with respect to the measurement surface, and the values of the differences of the respective measurement results were found with the magnetic flux density at the 0-degree position as a reference. The results are shown in FIG. 7. Based on the measurement results shown in FIG. 7, it can be seen that the magnetic flux density in the load area corresponding to the 180-degree position has changed the most with respect to the magnetic flux density of the no-load area (reference magnetic flux density) corresponding to the 0-degree position.

Similarly, taking a rolling bearing recognized as having wear and discoloration of the raceway surface of the outer ring to be the diagnosis target, the magnetic flux density was measured from the side surface side in the axial direction of the outer ring, and when compared with the result of pure fatigue, it was recognized that a large change in magnetic field appeared. The reason for this is thought to be that contact between metals that caused wear and discoloration to occur on the raceway surface also caused a change in the magnetic field to occur that was larger than the change in the material due to fatigue, and that appeared as a large measurement value of the magnetic flux density.

Based on the knowledge from the findings of such tests, by applying the fatigue diagnosis method of this example, not only is it possible to know the fatigue state of the rolling machine element by measuring the magnetic flux density from the side surface in the axial direction or from the circumferential surface of the raceway ring without having to perform disassembly, but it is also possible to know whether there is damage to the component of the rolling machine element and the extent of that damage, or to know the cause of that damage (for example, whether or not there is skewing that causes wear and discoloration).

As described above, with the fatigue diagnosis method for a rolling machine element of this example, it is possible to measure magnetic field information of an outer ring 5 of a rolling bearing 2 with a magnetic sensor 3 from the side surface in the axial direction or from the circumferential surface of the outer ring 5, and to diagnose the fatigue state of the outer ring 5 of the rolling bearing 2 based on change in the magnetic field information of the outer ring 5 acquired from the magnetic sensor 3. Therefore, it is possible to diagnose the fatigue state of the rolling bearing 2 without having to destruct the rolling bearing 2 and without having to disassemble the rolling bearing 2. Moreover, by knowing the magnetic field information, it is possible to detect a fatigued portion of the rolling bearing 2. Furthermore, not only is it possible to detect fatigued portions of the rolling bearing 2, but it is also possible to detect damaged portions such as due to wear or the like.

In addition, with the fatigue diagnosis method for a rolling machine element of this example, it is possible to know the fatigue state of the outer ring 5 of the rolling bearing 2 before the rolling bearing 2 becomes damaged, and thus, for example, it is possible to preset a threshold value to a value of a magnetic flux density corresponding to magnetic field information, and determine the fatigue state of the rolling bearing 2 by comparing the threshold value with a value of the magnetic flux density obtained from acquired magnetic field information of the outer ring 5. As a result, it becomes possible to more suitably determine the time for periodic replacement of the rolling bearing 2, and thus it becomes possible to operate the rolling bearing 2 and a device in which the rolling bearing 2 is installed more efficiently and safely. In regard to this, the same is true for a case where the fatigue diagnosis method for a rolling machine element of this example is applied to a linear motion device that includes components having a raceway surface.

Second Example

A second example of an embodiment of the present invention will be described using FIG. 8 to FIG. 14.
[Overall Configuration of Fatigue Diagnosis System]

The fatigue diagnosis system 1a of this example is for diagnosing the progression state of fatigue of a rolling bearing 2 that is a diagnosis target, and includes a magnetic sensor 3a and a diagnostic device 4a. The fatigue diagnosis system 1a is made to be sufficiently smaller than an X-ray diffraction apparatus, and is portable. The construction of the rolling bearing 2 that is the diagnosis target is the same as that of the first example, and thus a description of the rolling bearing 2 will be omitted. In this example as well, a case of applying the present invention to a rolling bearing as a rolling machine element will be described. More specifically, in the outer ring and the inner ring, which are components of the rolling bearing 2, bearing steel represented by high carbon chrome bearing steel (SUJ2) is used as magnetic material. However, the fatigue diagnosis system and fatigue diagnosis method of this example can also be widely applied to rolling bearings or linear motion devices including components having a raceway surface that use other magnetic materials for the components.

In this example, the fatigue state of the rolling bearing 2 is diagnosed based on the following principles. As described in the first example, when the rolling bearing 2 is used in an inner-ring rotation type usage form as illustrated in FIG. 3 and a radial load Fr is applied downward to the rotating shaft 17 on which the inner ring 6 is externally fitted, the magnetic flux density (magnetic field) of the outer ring 5 changes before and after use (before and after fatigue) of the rolling bearing 2. The change in the magnetic flux density occurs due to a change in the material structure of the magnetic material of the portion existing in the load area, and thus the amount of change in the magnetic flux density before and after use of the rolling bearing 2 is correlated with the degree of change in the material structure. The state of the material structure can be known by X-ray measurement, and therefore the correlation between the amount of change in the magnetic flux density before and after use of the rolling bearing 2 and the progression of fatigue (degree of change in the material structure) that is found by a diagnosis method using X-rays is found in advance. As a result, based on the amount of change in the magnetic flux density before and after use of the rolling bearing 2, it becomes possible to estimate the progression of fatigue that is found in a case where a diagnosis method that uses X-rays is performed. In this example, the fatigue state of the rolling bearing 2 is determined based on the following principles.

Figure 8:
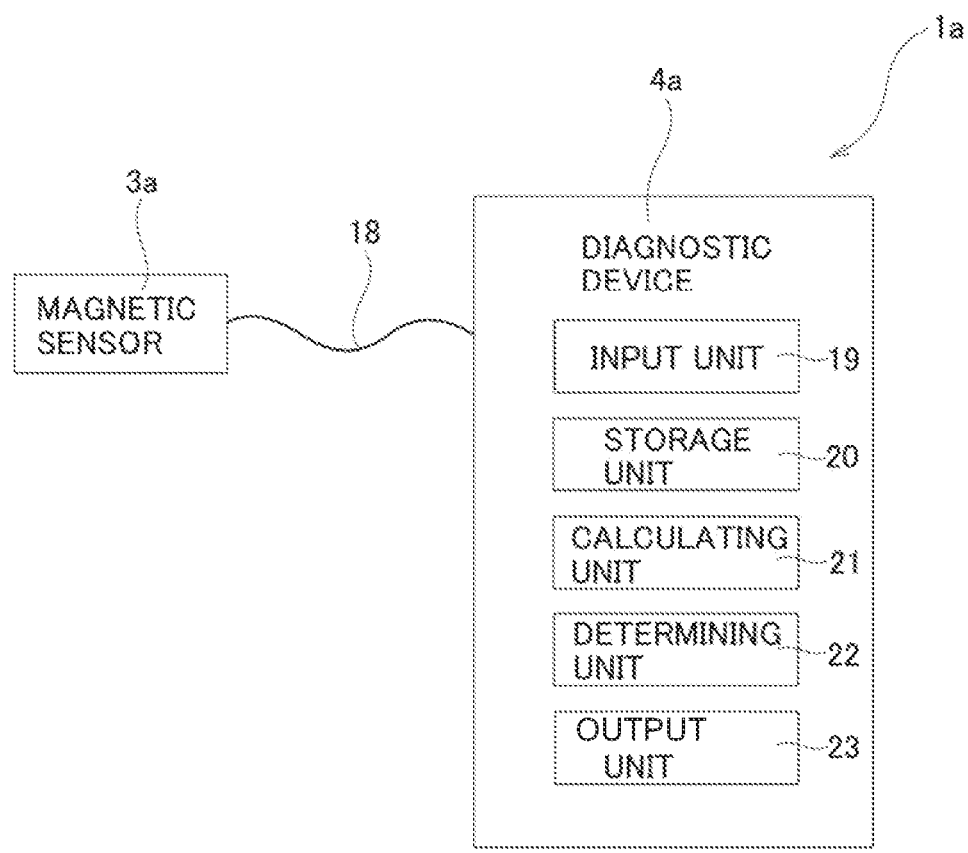
FIG. 8 is a block diagram of a fatigue diagnosis system of a second example of an embodiment of the present invention.

The fatigue diagnosis system 1a of this example, as illustrated in FIG. 8, includes a magnetic sensor 3a and a diagnostic device 4a.
<Magnetic Sensor>

The magnetic sensor 3a is a measuring device capable of measuring the magnetic flux density (magnetic field) in one or more directions, and is connected to the diagnostic device 4a via a connection cable 18. In this example, one magnetic sensor 3a is provided; however, it is possible to provide more than one.

The magnetic sensor 3a is composed of a detecting unit, circuits (including a drive circuit, processing circuit, and the like), and a substrate on which the detecting unit and circuits are mounted. The detecting unit includes a magnetic detecting element such as an MI element, a Hall element, a Hall IC, an MR element, a GMR element, an AMR element, a TMR element, or the like. In this example, an MI element is used as the detecting unit, and the magnetic sensor 3a is an MI sensor capable of measuring magnetic flux density in three directions. The MI sensor is a magnetic sensor that uses the magnetic impedance effect of an amorphous wire. In this kind of MI sensor, a drive circuit excites a high-frequency pulse current in the detecting unit (amorphous wire), and a detecting circuit detects an induced electromotive force that is generated in the detecting unit.

The magnetic sensor 3a is arranged near the outer ring 5 or inner ring 6, which are raceway rings, and measures the magnetic flux density (direction and intensity of the magnetic field) of the outer ring 5 or inner ring 6. Whether to arrange the magnetic sensor 3a near the outer ring 5 or the inner ring 6 is determined according to the usage form of the rolling bearing 2. For example, in a raceway ring where a load area and no-load area occur, it is easy for fatigue to proceed in the load area, and thus preferably the magnetic sensor 3a is arranged near a portion of this kind of raceway ring that corresponds to the load area in the circumferential direction (preferably the maximum load position located in the central portion in the circumferential direction of the load area).

In this example, an MI sensor that is capable of measuring magnetic flux density in three directions is used as the magnetic sensor 3a, and thus the magnetic sensor 3a is able to simultaneously and very accurately measure the magnetic flux density in the axial direction, radial direction, and circumferential direction of the rolling bearing 2. However, in fatigue diagnosis, it is sufficient to use the magnetic flux density of at least one of the axial direction and radial direction of the rolling bearing 2 among the measurement values in three directions, for which it is recognized that there is correlation with the progression of fatigue among.

The magnetic sensor 3a, in the execution step, together with being used for measurement of the magnetic flux density ($M_1$) after use (after fatigue, current state) of the rolling bearing 2, is also used for measurement of a reference magnetic flux density ($M_0$) that corresponds to the magnetic flux density before use (before fatigue, state of a new part) of the rolling bearing 2. Note that in the preparation step, preferably the magnetic sensor 3a or a sensor that is of the same type as the magnetic sensor 3a is used.

<Diagnostic Device>

The diagnostic device 4a has a function of determining the progression of fatigue of the rolling bearing 2. The diagnostic device 4a includes an input unit 19 for inputting data, a storage unit 20 for storing data, a calculating unit 21 for calculating the amount of change in magnetic flux density, a determining unit 22 for determining the progression of fatigue of the rolling bearing 2, and an output unit 23 for outputting measurement results.

An output signal from the magnetic sensor 3a is inputted to the input unit 19 of the diagnostic device 4a via a connection cable 18. More specifically, two kinds of magnetic flux density ($M_0$, $M_1$) from before and after use of the rolling bearing 2 are inputted to the diagnostic device 4a. The signal inputted from the magnetic sensor 3a is converted as necessary to processible data (for example, converted from analog data to digital data), then divided according to the kind of data and stored in the storage unit 20. Moreover, determination data found in advance in the preparation step and that indicates the correlation between the amount of change in the magnetic flux density and the progression of fatigue is inputted to the input unit 19 of the diagnostic device 4a and stored in the storage unit 20.

The calculating unit 21 has a function of calculating the amount of change (C) in the magnetic flux density of the rolling bearing 2 before and after use by finding the difference between the reference magnetic flux density ($M_0$) corresponding to the magnetic flux density before starting use of the rolling bearing 2 and the magnetic flux density $M_1$ after use of the rolling bearing 2 ($M_1-M_0$). The calculating unit 21 stores the calculated amount of change (C) in magnetic flux density in the storage unit 20.

The determining unit 22 determines (estimates) the progression of fatigue after use of the rolling bearing 2 from the amount of change (C) in the magnetic flux density of the rolling bearing 2 calculated by the calculating unit 21 based on determination data stored in the storage unit 20. For example, in a case where the determination data is represented by a function, the progression of fatigue is found by substituting the amount of change (C) in the magnetic flux density for the variable in the function. Moreover, in a case where the determination data is represented by a determination map divided according to the progression of fatigue, the progression of fatigue is found by determining which area of the determination map the amount of change (C) of the magnetic flux density is plotted on. Furthermore, in a case where the determination data is represented by a threshold value (numerical value), the progression of fatigue is found by comparing the size relationship between the amount of change in the magnetic flux density and the threshold value.

The output unit 23 visually displays the progression of fatigue of the rolling bearing 2 found by the determining unit 22, for example, displays a numerical value on a display, or audibly outputs the progression of fatigue from a speaker or the like. In addition to the progression of fatigue, the output unit 23 is also able to display (output) determination results such as "continued use is possible", "prepare for replacement (check inventory)", "replacement is required" and the like.

The diagnostic device 4a can be configured, for example, using a personal computer (information processing device), and each of the functions described above can be executed by executing a program. Note that it is also possible for the diagnostic device 4a to be given a function of finding determination data for indicating the correlation between the amount of change in magnetic flux density and the progression of fatigue.

[Fatigue Diagnosis Method]

Figure 9:
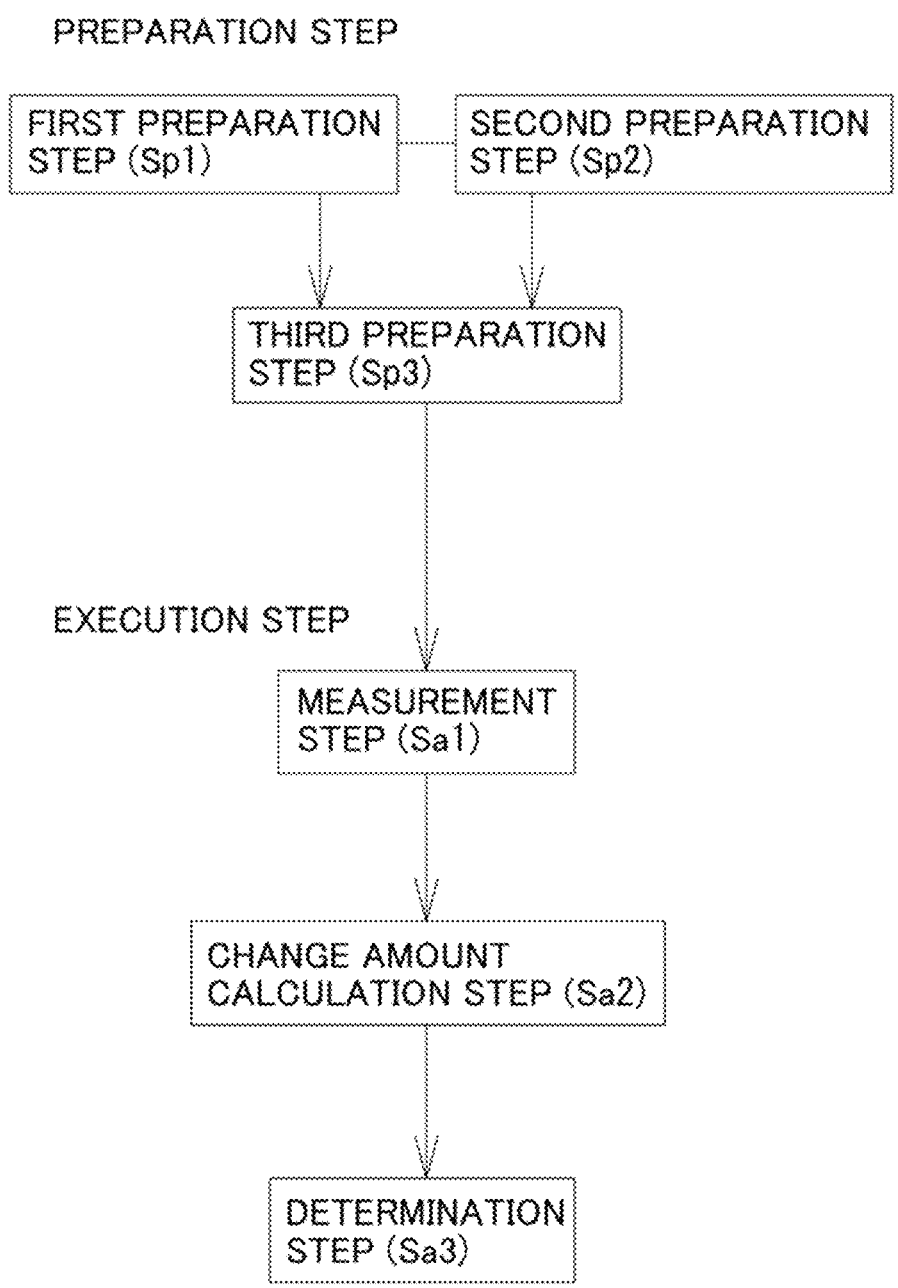
FIG. 9 is a flowchart illustrating each step of a fatigue diagnosis method of the second example.

The method for performing fatigue diagnosis of the rolling bearing 2 using the fatigue diagnosis system 1a of this example will be described. In this example, as illustrated in FIG. 9, when performing fatigue diagnosis of the rolling bearing 2, a preparation step and an execution step are executed. Note that in the fatigue diagnosis method of this example, the execution step corresponding to the diagnosis step in the fatigue diagnosis method of the present invention is an essential step and the preparation step is an optional step.

<Preparation Step>

The preparation step is a step that is performed for finding determination data by using a plurality of test bearings that are of the same type as the rolling bearing 2, and the preparation step is normally not performed at a site such as a factory or the like equipped with the equipment in which the rolling bearing 2 is assembled, but rather at a separate facility that is equipped with an X-ray diffraction apparatus and the like. This kind of preparation step does not need to be performed every time that fatigue diagnosis of the rolling bearing 2 is performed, and performing the step only one time is sufficient. In this example, the preparation step includes a first preparation step ($S_p1$), a second preparation step ($S_p2$), and a third preparation step ($S_p3$). Note that before performing the preparation step, a demagnetization process should be performed on the test bearings.

In the first preparation step ($S_p1$) of the steps of the fatigue diagnosis method illustrated in FIG. 9, a magnetic sensor 3a is used to measure the magnetic flux density in the axial direction and/or the radial direction of the test bearing before and after testing to find the amount of change. The test is performed by installing a test bearing in the test device and then operating that test bearing in the same usage form and under the same conditions (load condition, lubrication conditions, rotational speed, and the like) as those of the rolling bearing 2 for a specified amount of time or until the bearing is damaged. Before and after this kind of test, the magnetic flux density is measured by the magnetic sensor 3a at the same position of the raceway ring without disassembling the test bearing. More specifically, the magnetic flux density of a portion in the circumferential direction of the raceway ring that corresponds to the load area is measured. In order for that, the magnetic sensor 3a is arranged near a portion in the circumferential direction of the raceway ring that corresponds to the load area, and the detecting unit of the magnetic sensor 3a is brought into contact with or brought close so as to face the side surface in the axial direction or the circumferential surface of the raceway ring. Note that after testing the test bearing, a demagnetization process is not performed on the test bearing before measuring the magnetic flux density.

The value of the magnetic flux density of the test bearing before testing can be substituted, for example, by the value measured by the magnetic sensor 3a after testing of the portion in the circumferential direction of the raceway ring that corresponds to the no-load area. In this case, it is possible to omit the preparation step of this example.

In the first preparation step ($S_p1$), the magnetic flux density before testing and the magnetic flux density after testing are found for each test bearing, and the amount of change (difference) in the magnetic flux density before and after testing is found.

The second preparation step ($S_p2$) is performed parallel to the first preparation step ($S_p1$), and the progression of fatigue of the test bearings after testing is found by X-ray measurement using an X-ray diffraction apparatus. More specifically, the state of the metal structure (material structure) of the raceway surface before testing and after testing is known by irradiating X-rays onto the same position of the raceway ring of the test bearing where the magnetic flux density is measured by the magnetic sensor $3a$ (portion corresponding to the load area) and obtaining an X-ray diffraction spectrum. When doing this, in the case of circumstances in which the irradiated X-rays do not reach the measured surface or the like, the raceway ring is cut when necessary in order to perform measurement. The amount of decrease in the martensite half width before and after testing is found from the X-ray diffraction spectrum.

In the X-ray measurement, in addition to the amount of decrease in the martensite half width, it is also possible to measure the amount of decrease in retained austenite and the value of residual stress. In order for this, Equation (1) below is used to find the progression of fatigue (%).

$$\text{Progression of fatigue (\%)} = k \times (\text{Amount of decrease in martensite half width} + a \times \text{Amount of decrease in retained austenite}) \tag{1}$$

In Equation (1), k is a coefficient that is determined according to the usage environment of the bearing, and a is a coefficient determined according to the metal material.

The progression of fatigue can also be found by using Equation (2) below in addition to Equation (1).

$$\text{Progression of fatigue (\%)} = 60 \times \text{Amount of decrease in martensite half width} \tag{2}$$

The progression of fatigue (%) found from Equation (1) and Equation (2) above means that fatigue has progressed more the higher the value. Note that Equation (2) above is a calculation equation that takes into consideration the amount of decrease in retained austenite and is used when finding the progression of fatigue; however, in a case where it is necessary to find the progression of fatigue more accurately, it is preferable to use Equation (1) above.

Figure 14:
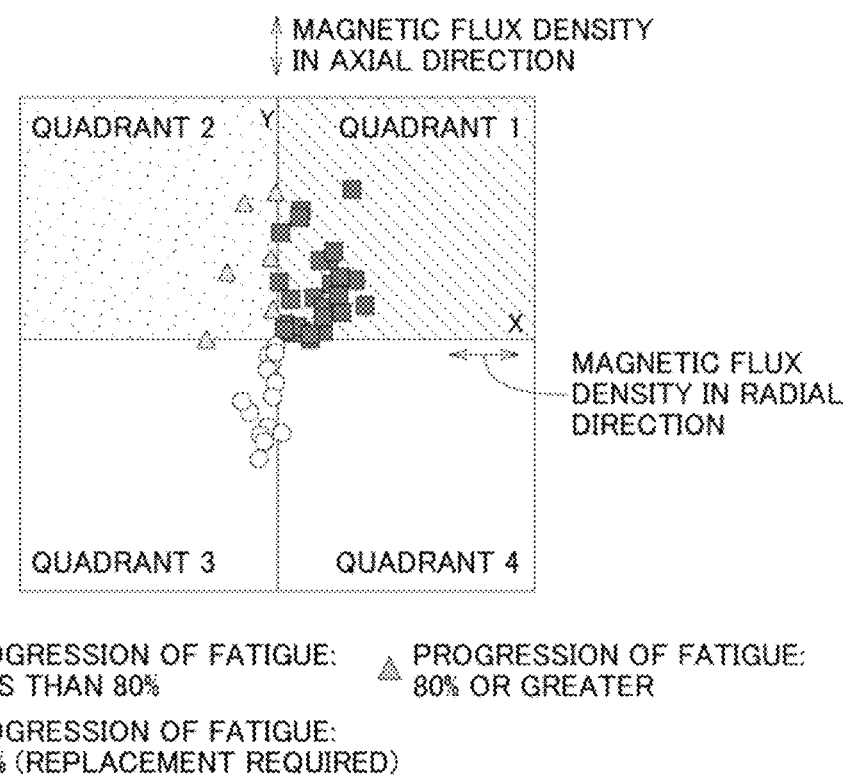
FIG. 14 is a scatter diagram that plots the calculated values of the amount of change in magnetic flux density on a two-dimensional coordinate system in which, in the second example, the amount of change in magnetic flux density in the radial direction is taken to be the X axis, and the amount of change in magnetic flux density in the axial direction is taken to be the Y axis, and is a two-dimensional map with mapping according to the degree of fatigue progression.

In the third preparation step ($S_p3$), determination data indicating the correlation between the progression of fatigue found in the second preparation step ($S_p2$) and the amount of change in magnetic flux density found in the first preparation step ($S_p1$) is found. More specifically, in a case where the amount of decrease in magnetic flux density in the axial direction and radial direction of the test bearing is found in the first preparation step ($S_p1$), determination data (database) such as a map, table, relational expression, threshold value, or the like indicating the correlation between the amount of change in magnetic flux density in the axial direction and the amount of change in magnetic flux density in the radial direction is found. In a case where the determination data is a map, it is possible to form a two-dimensional determination map on which the progression of fatigue is mapped using coordinates where the amount of change in the magnetic flux density in the axial direction and the amount of change in magnetic flux density in the radial direction are the two axes. When creating the determination map, first, as illustrated in FIG. 14, a coordinate system is formed in which the amount of change in magnetic flux density in the radial direction is taken to be the X-axis, and the amount of change in magnetic flux density in the axial direction is taken to be the Y-axis, and the calculated values for the amount of change in magnetic flux density are plotted on that coordinate system. Next, each plot and progression of fatigue on the coordinate system are correlated (linked) by differentiating (grouping) the shape, color, size or the like of the plots according to the progression in fatigue. Based on this, the bias of the plot position for each group on the coordinate system is noticed, the coordinates are divided according to the progression of fatigue, and the determination range of the progression of fatigue is determined. In other words, a determination area corresponding to the progression of fatigue is set on the coordinate system. More specifically, an area where the progression of fatigue is less than 80%, an area where the progression of fatigue is equal to or greater than 80% and less than 100%, an area where the progression of fatigue is equal to or greater than 100%, and the like are set on the coordinate system.

On the other hand, in a case where only the amount of change in magnetic flux density in either the axial direction or the radial direction of the test bearing is found in the first preparation step, determination data such as a map, relational expression, table, threshold value or the like indicating the correlation between the progression of fatigue and the amount of change in magnetic flux density in either one of the directions is found.

The determination data (map, table, relational expression, or the like) such as described above differs depending on the shape, size, material, usage conditions, and the like of the rolling bearing 2, and thus the determination data is prepared according to the rolling bearing 2 that is the diagnosis target. In other words, in a case of performing diagnosis a plurality of times on a rolling bearing 2 having the same specifications, the determination data does not have to be created each time that diagnosis is performed, and it is sufficient to create the data just the first time.

<Execution Step>

Figure 11:
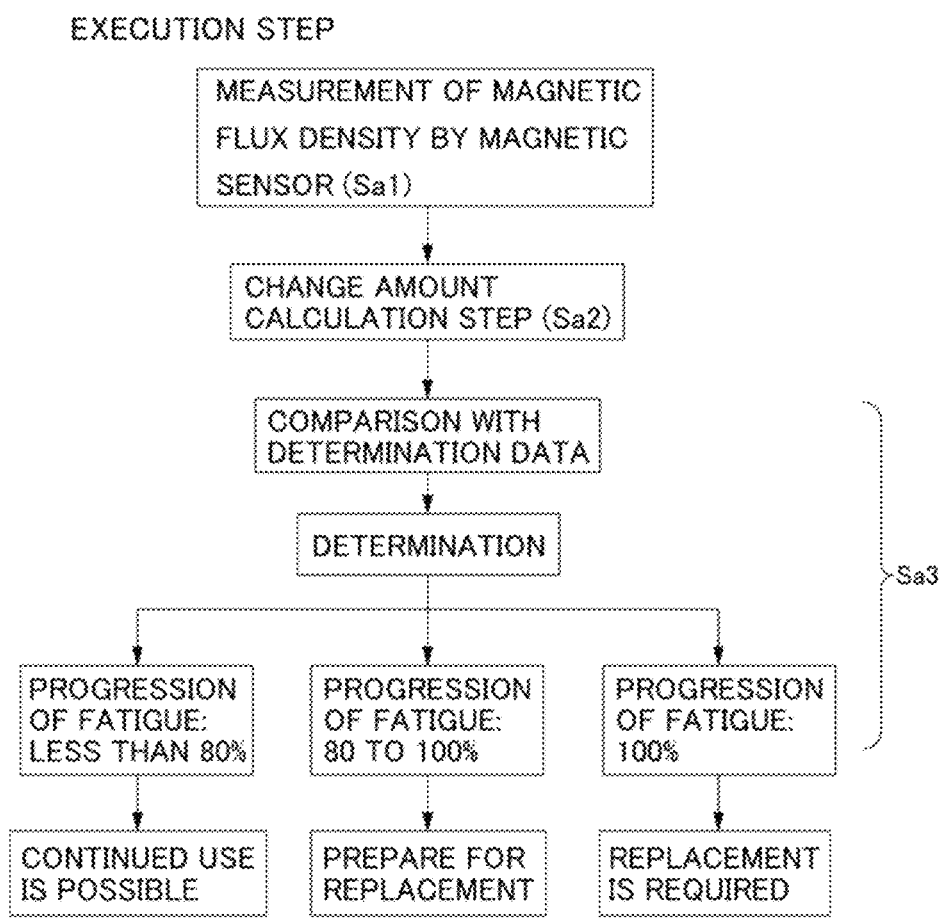
FIG. 11 is a flowchart for explaining an execution step for executing the fatigue diagnosis method of the second example.

The execution step is a step (diagnosis step) for performing fatigue diagnosis on the rolling bearing 2 as a target, and differing from the preparation step, this step is performed at the factory or the like equipped with equipment in which the rolling bearing 2 is installed. In this example, the execution step includes the next measurement step ($S_a1$), change amount calculation step ($S_a2$), and determination step ($S_a3$), and is performed as illustrated in FIG. 11.

Figure 10A:
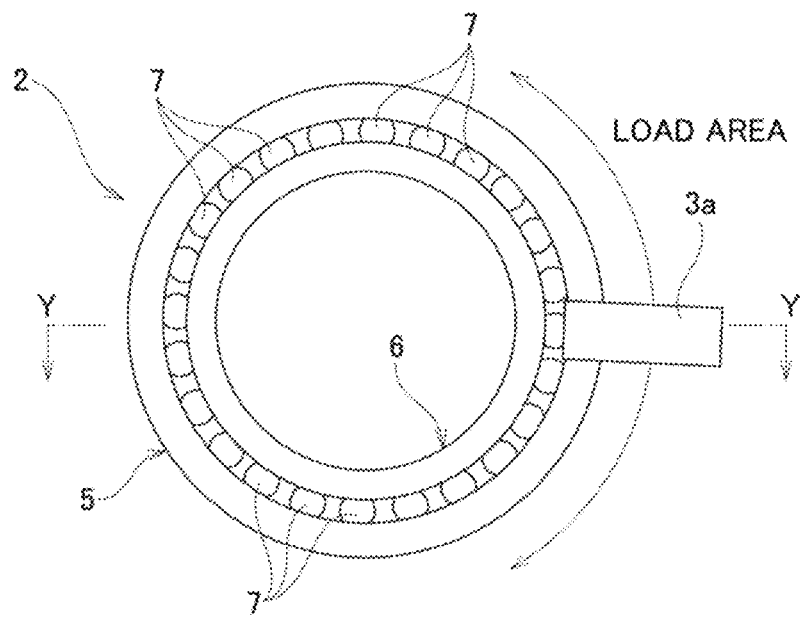
FIG. 10A is a side view illustrating a measurement step in which a magnetic sensor measures the magnetic flux density of a raceway ring which is a component of rolling machine element (roller bearing) in the second example.
Figure 10B:
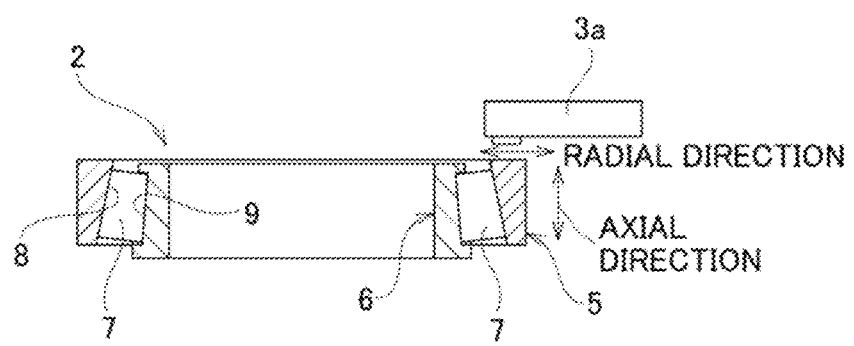
FIG. 10B is a cross-sectional view of section line Y-Y in FIG. 10A.

In the measurement step ($S_a1$), the rolling bearing 2 is removed from the equipment, and without disassembling the rolling bearing 2, the magnetic flux density in the axial direction and/or radial direction of the rolling bearing 2 is measured by a magnetic sensor $3a$ that is arranged near the raceway ring. More specifically, as illustrated in FIG. 10A and FIG. 10B, the magnetic sensor $3a$ is arranged near a portion in the circumferential direction of the raceway ring of the rolling bearing 2 that corresponds to the load area (preferably the center position in the circumferential direction of the load area), and the detecting unit of the magnetic sensor $3a$ is brought into contact with or made to closely face the side surface in the axial direction or circumferential surface of the raceway ring. In the illustrated example, the magnetic sensor $3a$ is arranged close to the center position in the axial direction of the load area of the outer ring 5 without disassembling the rolling bearing 2, and the detecting unit of the magnetic sensor $3a$ is made to closely face the side surface in the axial direction of the outer ring 5. Then, the magnetic flux density ($M_1$) in the axial direction and/or radial direction of the rolling bearing 2 is found. An output signal from the magnetic sensor $3a$ is inputted to the diagnostic device $4a$ via a connection cable 18.

In the change amount calculation step ($S_a2$), the calculating unit 21 of the diagnostic device $4a$ calculates the amount of change (C) in the magnetic flux density ($M_1$) measured in the measurement step ($S_a1$) based on the reference magnetic flux density ($M_0$) that corresponds to the magnetic flux density before starting to use the rolling bearing 2.

The reference magnetic flux density ($M_0$) can be measured by any of the following methods (A) to (D) according to the usage form of the rolling bearing (2) (generated range of the load area) or the like, and stored in the storage unit 20.

(A) The magnetic sensor 3 is arranged at a position (position that is the load area) of the raceway ring of a new rolling bearing 2 that is the same as the measurement position for measuring the magnetic flux density ($M_1$) in the measurement step ($S_a1$), and measures the reference magnetic flux density ($M_0$) of the rolling bearing 2 before use.

(B) The magnetic sensor 3a is arranged at a portion in the circumferential direction of the raceway ring of the rolling bearing 2 after use corresponding to a no-load area (for example, the opposite side in the radial direction from the position of maximum load), and measures the reference magnetic flux density ($M_0$) before and after the measurement step ($S_a1$), or simultaneously with the measurement step ($S_a1$).

(C) The magnetic sensor 3a is arranged near the raceway ring of a reference bearing that is of the same type as the rolling bearing 2, and measures the reference magnetic flux density ($M_0$).

(D) The magnetic sensor 3a is arranged at a surrounding position (for example a space) separated from the rolling bearing 2 that is not affected by changes in the magnetic field, and measures the reference magnetic flux density ($M_0$).

Note that in a case where the reference magnetic flux density ($M_0$) is measured simultaneously with the measurement step (magnetic flux density $M_1$), as illustrated in FIG. 6, it is possible to simultaneously measure two kinds of magnetic flux density using two magnetic sensors 3a. Moreover, in a case where the method in (B) above is used, by fixing the magnetic sensor 3a and rotating the raceway ring (rotate one turn), it is possible to measure the magnetic flux density of one turn of the raceway ring, and based on that, it is possible to find the two magnetic flux densities ($M_0$, $M_1$). Conversely, it is also possible to fix the raceway ring and the measure the magnetic flux density while moving the magnetic sensor 3a one time around along the raceway ring; however, from the aspect of maintaining good measurement accuracy, preferably measurement is performed by fixing the magnetic sensor 3a.

In the determination step ($S_a3$), the determining unit 22 determines (estimates) the progression of fatigue of the rolling bearing 2 from the amount of change (C) in the magnetic flux density calculated by the calculating unit 21 based on determination data stored in the storage unit 20. More specifically, by comparing the amount of change (C) in magnetic flux density and the determination data, the value of the progression of fatigue found in a case of performing a diagnosis method that use X-rays is estimated from the amount of change (C) in magnetic flux density before and after use of the rolling bearing 2. When doing this, the determination data used when performing the comparison is found based on the direction (axial direction and/or radial direction) of magnetic flux density measured in the measurement step and the amount of change in magnetic flux density in the same direction. For example, in a case where only the magnetic flux density in the axial direction (or in the radial direction) is found in the measurement step, the determination data used is data that indicates the correlation between the magnetic flux density in the axial direction (or in the radial direction) and the progression of fatigue. In a case where the determination data is a determination map such as illustrated in FIG. 14 and is divided into an area where the progression of fatigue is less than 80%, an area where the progression of fatigue is equal to or greater than 80% and less than 100%, and an area where the progression of fatigue is equal to or greater than 100%, by determining which area in the determination map where the amount of change (C) in magnetic flux density before and after use of the rolling bearing 2 is plotted, the progression of fatigue in that area is estimated to be the progression of fatigue of the rolling bearing 2.

By estimating the value of the progression of fatigue of the rolling bearing 2 in this way, the output unit 23 of the diagnostic device 4a visually displays the progression of fatigue of the rolling bearing 2 found by the determining unit 22 on a display for example, or audibly outputs the progression of fatigue using a speaker or the like. In addition, depending on the determined progression of fatigue, the output unit 23 is also able to display determination results such as "continued use is possible", "prepare for replacement (check inventory)", "replacement is required" and the like.

With the fatigue diagnosis system 1a and the fatigue diagnosis method of this example, together with being able to know the state of the progression of fatigue before damage to the bearing components occurs, it is also possible to perform diagnosis of fatigue without having to disassemble the rolling bearing 2. In other words, in this example, by finding the amount of change in magnetic flux density before and after use of the rolling bearing 2, it becomes possible to estimate the progression of fatigue that will be found when a diagnosis method using X-rays is performed. Therefore, it is possible to know the state of the progression of fatigue of the rolling bearing 2 before damage such as peeling or the like of the bearing components of the rolling bearing 2 occurs. Accordingly, by being able to perform replacement work of the rolling bearing 2 when the equipment is not in operation, periodically replace the rolling bearing 2, and the like, it is possible to operate the equipment efficiently and safely. Moreover, fatigue diagnosis of the rolling bearing 2 can be performed at a site such as a factory or the like equipped with equipment in which the rolling bearing 2 is installed, and it is possible to know the determination results at that site, and thus it becomes possible to quickly respond to the fatigue state of the rolling bearing 2.

In this example, in order to know the state of progression of fatigue of the rolling bearing 2, it is not necessary to disassemble the rolling bearing 2, and thus it is possible to perform diagnosis (maintenance) with fewer steps than in a case of performing a diagnosis method that uses X-rays. Furthermore, non-destructive diagnosis can be performed without having to cut the bearing components that is required in a diagnosis method using X-rays, and thus it is possible to reinstall and reuse the rolling bearing 2 after diagnosis.

The magnetic sensor 3a only measures the magnetic flux density that changes according to changes in metal structure due to fatigue, and thus when performing fatigue diagnosis, it is not necessary to externally apply a voltage or the like to the rolling bearing 2. Moreover, the value of the magnetic flux density in the axial direction and/or radial direction that will be used for creating determination data is obtained as an output value from the magnetic sensor 3a without performing signal processing, and thus the calculation process required for creating determination data can be easily performed.

Practical Example

In this example, a practical example of a preparation step that is performed in order to create determination data will be described. In this practical example, 72 conical roller bearings (model number. HR32017XJ) were prepared. Then, using an inner-ring rotation type usage form and with the 72 test bearings as target, testing was performed by rotating the rotating shaft (inner ring) at 1500 rpm while lubricating each part with a forced lubrication of lubricating oil, and as a test load, a radial load Fr of 61,740 N (6,300 kgf) and an axial load Fa of 18,620 N (1,900 kgf) was applied to the rotating shaft. Note that the test bearing (HR32017XJ) has an outer diameter of 130 mm and an inner diameter of 85 mm, and all of the bearing components (outer ring, inner ring and conical rollers) are made of high carbon chrome bearing steel.

For 32 test bearings of the 72 test bearings, the value of the magnetic flux density was measured at elapsed times of 1 hour, 24 hours, 48 hours, 96 hours, 250 hours and 1000 hours from the start of testing, and measurement was performed by removing the test bearing from the test device, but without disassembling the test bearing.

On the other hand, for 40 of the test bearings, before testing was performed, iron powder (hardness of 870 Hv, size of 150 μm or less, mass of 0.3 g) was mixed into the lubrication oil (ISO-VG10), then the test bearing was operated under the same conditions as in the testing above for only one minute until the raceway surface was indented, after which the same testing as above was performed. In the above testing after indentation, under conditions in which iron power was not mixed in the lubrication oil, operation was continued until the bearing was damaged. After that, the test bearing was removed from the test device and without disassembling the test bearing, the value of the magnetic flux density was measured.

When measuring the magnetic flux density, a magnetic sensor manufactured by Tokyo Rigakukensa (Model No. BE90A1E) was used. As in the case shown in FIG. 10A and FIG. 10B, a measurement device using a magnetic sensor was arranged at a central position in the circumferential direction of the load area where the progression of fatigue occurs most easily, and measurement was performed by closely facing the detecting unit toward the side surface in the axial direction of the outer ring. The measurement timing was before testing was started and after testing was ended, and the magnetic flux density was measured at the measurement position both times. Moreover, the amount of change in the magnetic flux density before and after testing was found by subtracting the value of the magnetic flux density before the start of testing from the value of the magnetic flux density after the end of testing.

The progression of fatigue of the test bearing before and after testing was found by X-ray measurement using an X-ray diffraction device (manufactured by Rigaku Corporation). More specifically, before testing is started and after testing has ended, the same portion of the raceway surface of the outer-ring raceway as the measurement position when using the magnetic sensor was irradiated with X-rays to obtain an X-ray diffraction spectrum. Then, the amount of decrease in the martensite half width before and after testing was found from the X-ray diffraction spectrum and using Equation 2 above. The progression of fatigue tends to become large as the test time becomes long, and the values of progression of fatigue of the samples with indentations on the raceway surface became large regardless of the test time.

Figure 12:
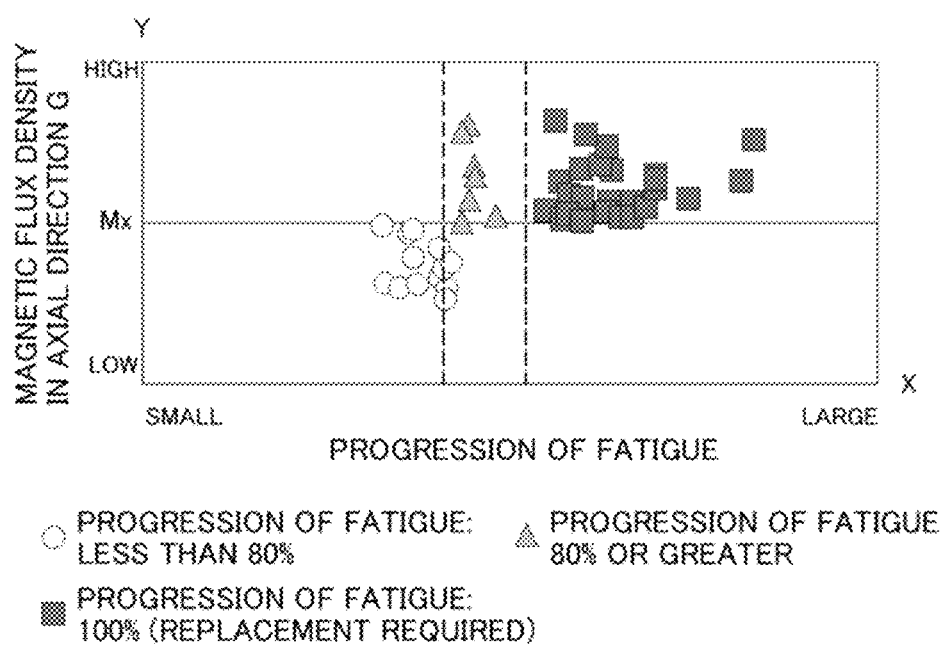
FIG. 12 is a scatter diagram that plots the calculated value for the test bearing on a two-dimensional coordinate system in which, in the second example, the fatigue progression degree is taken as the X-axis and the amount of change in magnetic flux density in the axial direction is taken as the Y-axis.

FIG. 12 is a scatter diagram that plots the calculated value found for each test bearing on a coordinate system in which the progression of fatigue is taken to be along the X-axis, and the amount of change in the magnetic flux density in the axial direction before and after testing is taken to be along the Y-axis. From FIG. 12, it can be confirmed that the amount of change in the magnetic flux density in the axial direction becomes larger as the progression of fatigue becomes larger. Therefore, by finding a relational expression indicating the correlation between the progression of fatigue and the amount of change in magnetic flux density in the axial direction (approximation straight line, approximation curve, or the like), it is possible to use that relational expression as determination data.

Moreover, FIG. 12 illustrates making the shapes of the plots different according to the progression of fatigue. More specifically, the progression of fatigue is divided into three groups: a group in which the progression of fatigue is less than 80% is plotted using a circle shape; a group in which the progression of fatigue is equal to or greater than 80% and less than 100% is plotted using a triangular shape; and a group in which the progression of fatigue is 100% or more is plotted using a square shape. Here, a bias in the position of the plots for each group on the coordinate system is noticed, and from FIG. 12, it is possible to find a threshold value for determining the progression of fatigue. In other words, in FIG. 12, approximately, when the amount of change in magnetic flux density in the axial direction becomes larger than Mx, the progression of fatigue becomes 80% or more, and when the amount of change in magnetic flux density in the axial direction becomes less than Mx, the progression of fatigue becomes less than 80%. Therefore, by using Mx as a threshold value, in a case where the amount of change in the magnetic flux density in the axial direction becomes larger than Mx, it is possible to determine that the progression of fatigue is equal to or greater than 80%, and in a case where the amount of change in the magnetic flux density in the axial direction is less than Mx, it is possible to determine that the progression of fatigue is less than 80%.

Figure 13:
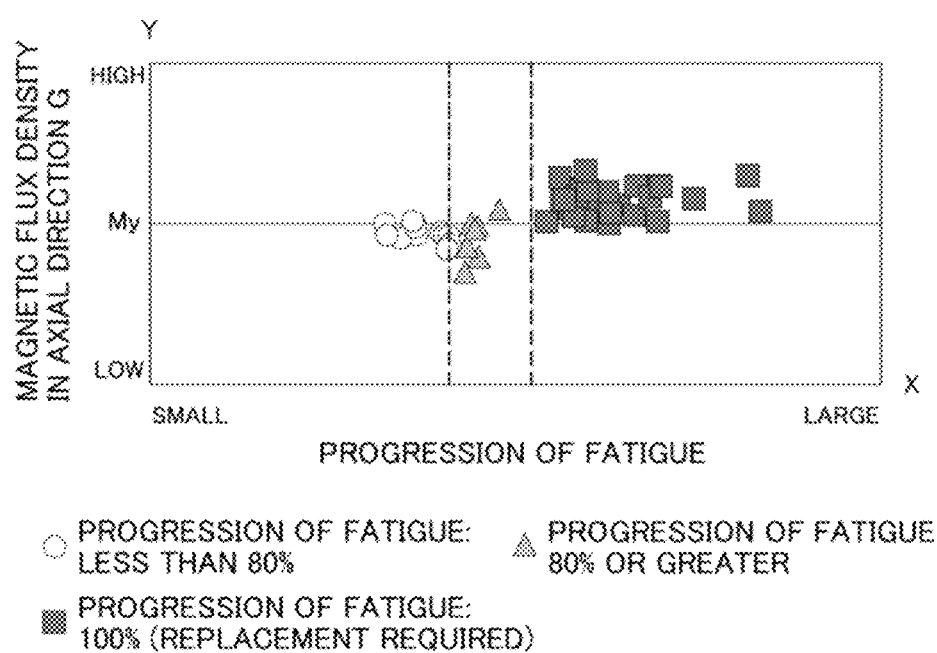
FIG. 13 is a scatter diagram that plots the calculated values for the test bearing on a two-dimensional coordinate system in which, in the second example, the fatigue progression degree is taken as the X-axis and the amount of change in magnetic flux density in the radial direction is taken as the Y-axis.

FIG. 13 is a scatter diagram that plots the calculated value found for each test bearing on a coordinate system in which the progression of fatigue is taken to be along the X-axis, and the amount of change in the magnetic flux density in the radial direction before and after testing is taken to be along the Y-axis. From FIG. 13, it can be confirmed that the amount of change in the magnetic flux density in the radial direction becomes larger as the progression of fatigue becomes larger. Therefore, by finding a relational expression indicating the correlation between the progression of fatigue and the amount of change in magnetic flux density in the radial direction (approximation straight line, approximation curve, or the like), it is possible to use that relational expression as determination data.

Moreover, FIG. 13, similar to FIG. 12, illustrates making the shapes of the plots different according to the progression of fatigue (for each of three groups). Here, a bias in the position of the plots for each group on the coordinate system is noticed, and from FIG. 13, it is possible to find a threshold value for determining the progression of fatigue. In other words, in FIG. 13, approximately, when the amount of change in magnetic flux density in the radial direction becomes larger than My, the progression of fatigue becomes 100% or more, and when the amount of change in magnetic flux density in the radial direction becomes less than My, the progression of fatigue becomes less than 100%. Therefore, by using My as a threshold value, in a case where the amount of change in the magnetic flux density in the radial direction becomes larger than My, it is possible to determine that the progression of fatigue is equal to or greater than 100%, and in a case where the amount of change in the magnetic flux density in the radial direction is less than My, it is possible to determine that the progression of fatigue is less than 100%.

FIG. 14 is a scatter diagram that plots the amount of change in the magnetic flux density, which is a calculated value found for each test bearing, on a coordinate system in which the amount of change in the magnetic flux density in the radial direction is taken to be along the X-axis, and the amount of change in the magnetic flux density in the axial direction is taken to be along the Y-axis. Moreover, FIG. 14, similar to FIG. 12 and FIG. 13, illustrates making the shapes of the plots different according to the progression of fatigue (for each of three groups). For this kind of FIG. 14, it can be found that in the first quadrant, the plot is concentrated on the group in which the progression of fatigue is equal to or greater than 100%, in the second quadrant, the plot is concentrated on the group in which the progression of fatigue is equal to or greater than 80% and less than 100%, and in the third quadrant, the plot is concentrated on the group in which the progression of fatigue is less than 80%. Therefore, by mapping the progression of fatigue on the coordinate system, the map can be used as a two-dimensional determination map. In other words, the first quadrant can be set as an area where the progression of fatigue is equal to or greater than 100%, the second quadrant can be set as an area where the progression of fatigue is equal to or greater than 80% and less than 100%, and the third quadrant can be set as an area where the progression of fatigue is less than 80%. Moreover, it is possible to find a relational expression (approximation line, approximation curve, or the like) indicating the correlation between the progression of fatigue, and the amount of change in the magnetic flux density in the axial direction and the amount of change in the magnetic flux density in the radial direction, and then use that relational expression as determination data.

In this practical example, as described above, it is possible to find three kinds of determination data: determination data indicating the relationship between the progression of fatigue and the amount of change in magnetic flux density in the axial direction; determination data indicating the relationship between the progression of fatigue and the amount in change in magnetic flux density in the radial direction; and determination data indicating the relationship between the progression of fatigue, and the amount of change in magnetic flux density in the axial direction and the amount of change in magnetic flux density in the radial direction. Therefore, this kind of determination data is stored in advance in the storage unit 20 of the diagnostic device 4*a* and used in diagnosis of the rolling bearing 2 on site. It is possible to set which determination data to use according to the required diagnostic accuracy (diagnosis information). More specifically, in a case where high diagnostic accuracy is necessary, determination data indicating the correlation between the progression of fatigue, and the amount of change in magnetic flux density in the axial direction and the amount of change in magnetic flux density in the radial direction (two-dimensional determination map) as illustrated in FIG. 14 is used. Moreover, even in a case where any determination data is used, it is possible to estimate the progression of fatigue to be found when a diagnosis method that uses X-rays is used without actually performing measurement using X-rays.

Each of the examples of an embodiment of the present invention described above can be appropriately combined and implemented as long as there is no contradiction.

The fatigue diagnosis method for a rolling machine element according to the present invention is not limited to the embodiments described above, and may undergo various modifications that are within the scope of the present invention. For example, in the fatigue diagnosis method of the first example, a relative comparison is made between the load area and other sites, and thus it is not always necessary to perform diagnosis around the entire circumference of the raceway ring; for example, it is possible to make a comparison between just the load area and the no-load area that is on the opposite side from the load area. Moreover, as long as the method is able to find changes in the load area, the comparison target does not have to be a no-load area.

Each of the examples of an embodiment of the present invention describes a fatigue diagnosis method for a rolling bearing as a diagnosis target; however, the fatigue diagnosis method for a rolling machine element of the present invention is not limited to this, and as is clear from the mechanism of action of the diagnosis method, it is possible, based on magnetic field information of the rolling machine element itself, whether it be a rolling bearing, linear motion device, or the like, to diagnose the fatigue state of the rolling machine element, whether or not there is damage to components of the rolling machine element, as well as the extent and the cause of that damage. More specifically, the diagnosis system and diagnosis method of the present invention can be applied to a linear motion device such as a linear guide, ball screw, and the like. Moreover, the diagnosis system and diagnosis method of the present invention can be applied as long as it is possible for a magnetic sensor to acquire changes in magnetic field information not only in cases where the components of the rolling machine element are made of ferromagnetic material, but also in cases where the components are made of paramagnetic material or diamagnetic material.

In a case where a rolling bearing is taken to be the diagnosis target, the rolling bearing is not limited to a single-row rolling bearing and could also be a double-row rolling bearing. Furthermore, the target bearing is not limited to a radial bearing and could also be a thrust bearing.

REFERENCE SIGNS LIST

1, 1*a* Fatigue diagnosis system
2 Rolling bearing
3, 3*a*, 3X, 3Y Magnetic sensor
4, 4*a* Diagnostic device
5 Outer ring
6 Inner ring
7 Rolling body
8 Outer-ring raceway
9 Inner-ring raceway
10 Retainer
11 Magnetic-sensing portion
12 Probe
13 Processing unit
14 External-output unit
15 Main unit
16 Signal cable
17 Rotating shaft 18 Connection cable
19 Input unit
20 Storage unit
21 Calculating unit
22 Determining unit
23 Output unit

The invention claimed is:

1. A fatigue diagnosis method for a rolling machine element that diagnoses a state of progression of fatigue of a rolling machine element; the fatigue diagnosis method comprising
a diagnosis step of diagnosing a fatigue state of the rolling machine element based on change in magnetic field information of the rolling machine element, wherein
the rolling machine element is a rolling bearing or a linear motion device comprising a component having a raceway surface made of a magnetic material,
the diagnosis step comprises a measurement step in which a magnetic sensor is arranged near the component and measures magnetic field information of the component,
the magnetic field information is magnetic flux density in an axial direction and a radial direction of the component,
the diagnosis step comprises a change amount calculation step that, based on a reference magnetic flux density corresponding to the magnetic flux density before the start of use of the component, calculates an amount of change in the magnetic flux density measured in the measurement step, and
the diagnosis step comprises a determination step that, using determination data that indicates a correlation between progression of fatigue of a test rolling machine element of the same kind as the rolling machine element that is found in advance by X-ray measurement using the test rolling machine element, and an amount of change in magnetic flux density in the axial direction and the radial direction of a component of the test rolling machine element of the same kind as the rolling machine element that is found in advance using the test rolling machine element, determines progression of fatigue of the rolling machine element based on the amount of change in the magnetic flux density calculated in the change amount calculation step.

2. The fatigue diagnosis method for a rolling machine element according to claim 1, wherein the reference magnetic flux density is a magnetic flux density of a portion of the component corresponding to a no-load area in a circumferential direction, or a magnetic flux density before use in a portion of the component corresponding to a load area in the circumferential direction; and magnetic flux density to be measured in the measurement step is magnetic flux density in a portion of the component corresponding to a load area in the circumferential direction.

3. The fatigue diagnosis method for a rolling machine element according to claim 1, further comprising
a preparation step for finding the determination data;
the preparation step comprising:
a first preparation step of finding an amount of change in magnetic flux density in an axial direction and/or radial direction of the component of the test rolling machine element before and after testing;
a second preparation step of finding progression of fatigue of the test rolling machine element after testing; and
a third preparation step of creating determination data indicating correlation between the progression of fatigue found in the second preparation step and the amount of change in magnetic flux density found in the first preparation step.

4. The fatigue diagnosis method for a rolling machine element according to claim 1, wherein the determination data is composed of a determination map in which progression of fatigue is mapped on a coordinate system having two axes that are the amount of change in magnetic flux density in the axial direction and the amount of change in magnetic flux density in the radial direction.

5. The fatigue diagnosis method for a rolling machine element according to claim 1 that performs diagnosis without having to disassemble the rolling machine element.

6. A fatigue diagnosis system for a rolling machine element, comprising:
a magnetic sensor capable of measuring magnetic flux density in an axial direction and/or radial direction of a component of a rolling machine element as a diagnosis target;
a calculating unit capable of calculating an amount of change in the magnetic flux density measured by the magnetic sensor based on a reference magnetic flux density corresponding to a magnetic flux density before starting use of the component;
a storage unit that stores determination data that indicates correlation between progression of fatigue of a test rolling machine element of the same kind as the rolling machine element that is found in advance by X-ray measurement using the test rolling machine element and an amount of change in magnetic flux density in an axial direction and/or radial direction of the component of the test rolling machine element that is found in advance using the test rolling machine element; and
a determining unit that determines progression of fatigue of the rolling machine element from the amount of change in magnetic flux density calculated by the calculating unit based on the determination data stored in the storage unit.

* * * * *